United States Patent
Ise et al.

(10) Patent No.: US 11,316,153 B2
(45) Date of Patent: Apr. 26, 2022

(54) LITHIUM ZINC SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Kazuki Ise, Kawasaki (JP); Yasunobu Yamashita, Tokyo (JP); Kazuomi Yoshima, Yokohama (JP); Shinsuke Matsuno, Tokyo (JP); Norio Takami, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 273 days.

(21) Appl. No.: 16/804,268

(22) Filed: Feb. 28, 2020

(65) Prior Publication Data
US 2020/0203721 A1  Jun. 25, 2020

Related U.S. Application Data

(63) Continuation of application No. PCT/JP2019/010837, filed on Mar. 15, 2019.

(30) Foreign Application Priority Data

Sep. 19, 2018 (JP) .............................. JP2018-175273
Mar. 11, 2019 (JP) .............................. JP2019-043630

(51) Int. Cl.
*H01M 4/36* (2006.01)
*H01M 4/38* (2006.01)
(Continued)

(52) U.S. Cl.
CPC ............. *H01M 4/366* (2013.01); *H01M 4/38* (2013.01); *H01M 4/483* (2013.01);
(Continued)

(58) Field of Classification Search
None
See application file for complete search history.

(56) References Cited

U.S. PATENT DOCUMENTS

| 10,079,390 B2 | 9/2018 | Matsuno et al. |
| 2017/0222272 A1 | 8/2017 | Takami et al. |

(Continued)

FOREIGN PATENT DOCUMENTS

| EP | 3 220 459 A1 | 9/2017 |
| JP | 2012-124182 A | 6/2012 |

(Continued)

OTHER PUBLICATIONS

International Search Report dated Aug. 6, 2019 in PCT/JP2019/010837 filed Mar. 15, 2019, 6 pages.

(Continued)

*Primary Examiner* — Christopher P Domone
(74) *Attorney, Agent, or Firm* — Oblon, McClelland, Maier & Neustadt, L.L.P.

(57) ABSTRACT

According to one embodiment, provided is a lithium zinc secondary battery including a positive electrode, a negative electrode, an aqueous electrolyte, and a separator between the positive electrode and the negative electrode. The negative electrode includes a zinc-including metal body and an oxide on at least a part of a surface of the metal body. The aqueous electrolyte includes zinc and a lithium salt. Zinc is dissolved and deposited at the negative electrode. Lithium is inserted and extracted from the oxide in a range of $-1.4$ V (vs. SCE) or more and $-1.0$ V (vs. SCE) or less. A specific surface area of the oxide is 10 $m^2/g$ or more and 350 $m^2/g$ or less. A mol concentration ratio Zn/Li between zinc and lithium in the aqueous electrolyte is $1.0 \times 10^{-5}$ or more and 0.3 or less.

14 Claims, 10 Drawing Sheets

(51) Int. Cl.
  *H01M 4/48*   (2010.01)
  *H01M 10/052*  (2010.01)
  *H01M 10/42*   (2006.01)
  *H01M 4/02*    (2006.01)

(52) U.S. Cl.
  CPC ....... *H01M 10/052* (2013.01); *H01M 10/425* (2013.01); *H01M 2004/021* (2013.01); *H01M 2004/027* (2013.01); *H01M 2010/4271* (2013.01)

(56) References Cited

U.S. PATENT DOCUMENTS

2019/0312303 A1* 10/2019 Yang ........................ H01M 4/24
2021/0005937 A1*  1/2021 Wang ................ H01M 10/0569

FOREIGN PATENT DOCUMENTS

| JP | 2013-234102 A | 11/2013 |
| JP | 2017-174810 A | 9/2017 |
| JP | 2018-32646 A | 3/2018 |
| WO | WO 2010/137154 A1 | 12/2010 |
| WO | WO 2011/010371 A1 | 1/2011 |
| WO | WO 2017/135323 A1 | 8/2017 |

OTHER PUBLICATIONS

Written Opinion dated Aug. 6, 2019 in PCT/JP2019/010837 filed Mar. 15, 2019, 12 pages.
Yesibolati et al. "High Performance Zn/LiFePO4 Aqueous Rechargeable Battery for Large Scale Applications", Electrochimica Acta 152, 2015, pp. 505-511.

* cited by examiner

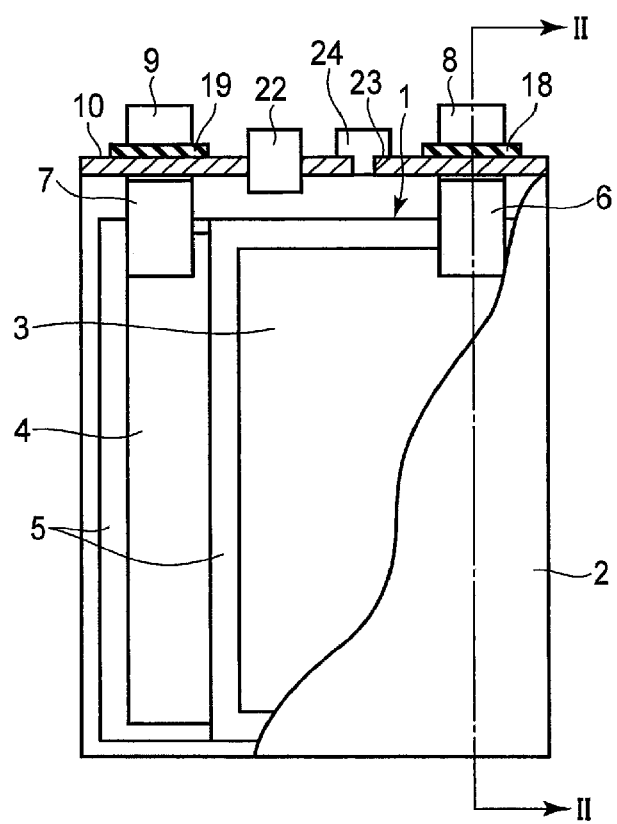
F I G. 1

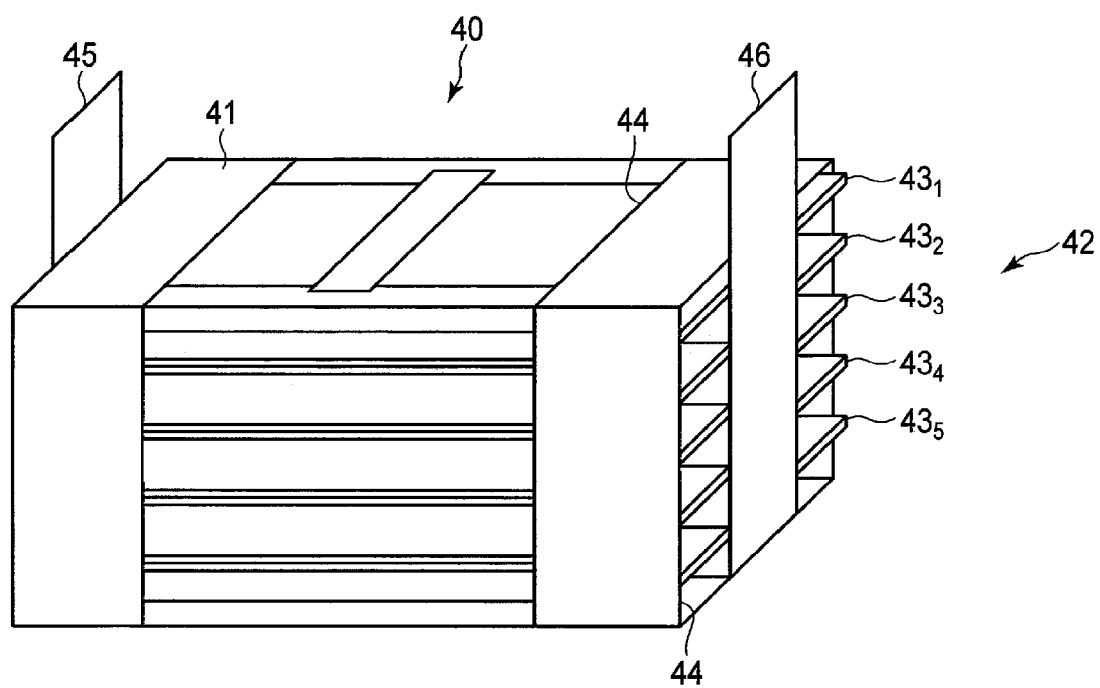
F I G. 6

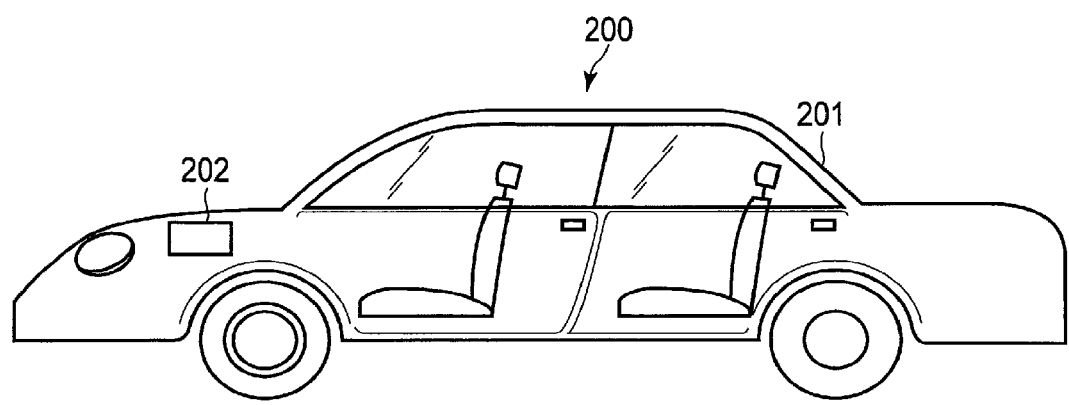
F I G. 9

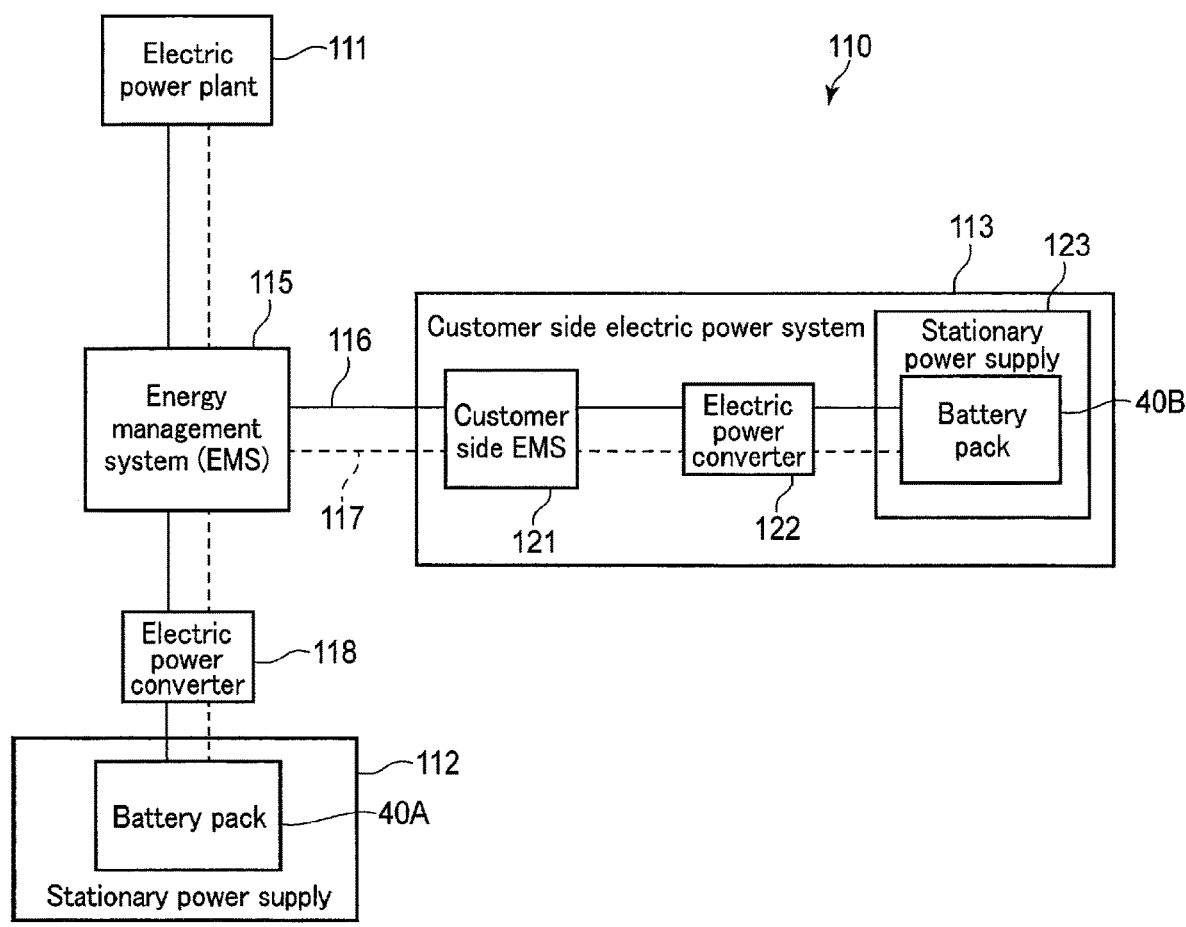
F I G. 11

US 11,316,153 B2

LITHIUM ZINC SECONDARY BATTERY, BATTERY PACK, VEHICLE, AND STATIONARY POWER SUPPLY

CROSS-REFERENCE TO RELATED APPLICATIONS

This application is a Continuation Application of PCT Application No. PCT/JP2019/010837, filed Mar. 15, 2019 and based upon and claiming the benefit of priority from Japanese Patent Application No. 2018-175273, filed Sep. 19, 2018, and Japanese Patent Application No. 2019-043630, filed Mar. 11, 2019, the entire contents of all of which are incorporated herein by reference.

FIELD

Embodiments described herein relate generally to a lithium zinc secondary battery, a battery pack, a vehicle, and a stationary power supply.

BACKGROUND

Recently, as a battery having a high energy density, batteries formed using a nonaqueous solvent have been developed, such as a lithium ion secondary battery. The lithium ion secondary battery is excellent in energy density and cycle performance compared to a lead storage battery and a nickel hydrogen secondary battery, and is anticipated for use as a large electricity storage power source, such as a power source for vehicles such as hybrid vehicles and electric vehicles. From the viewpoint of providing a large potential window, a nonaqueous solvent such as ethylene carbonate, diethyl carbonate or propylene carbonate is used as an electrolyte of the lithium ion secondary battery. Since these solvents are flammable, there are safety problems. If the solvents can be replaced with an aqueous electrolyte, the problems can fundamentally be solved. In addition, the aqueous electrolyte is inexpensive, compared to a nonaqueous solvent-based electrolyte. Further, no longer would production process need be performed in an inert atmosphere. Therefore, by replacing the nonaqueous solution-based electrolyte with the aqueous electrolyte, large cost reduction is expected. However, there is a large problem in the use of the aqueous electrolyte for the lithium ion secondary battery. The problem is that since the theoretical decomposition voltage calculated from the chemical equilibrium of water is 1.23 V, when a battery is configured to have a greater design voltage, oxygen is generated in a positive electrode and hydrogen is generated in a negative electrode. In order to solve the problem, the oxygen overvoltage can be increased at the oxidation side (positive electrode side), the hydrogen overvoltage can be increased at the reduction side (negative electrode side), and the design of the battery can be improved in viewpoint of kinetics.

In the lithium ion secondary battery formed by using an aqueous solution, the charge-discharge process of the positive electrode is relatively easy. There are many reported examples of positive electrode active materials such as $LiCoO_2$, $LiMn_2O_4$, and $LiFePO_4$. Meanwhile, for the negative electrode active material, although there have been reported examples such as $LiTi_2(PO_4)_3$, $TiP_2O_7$, and $VO_2$ (B), which have a lithium insertion/extraction potential of about −0.5 V (vs. SHE), there are only few reported examples using active materials which operate at lower potentials. This is due to charge-discharge being difficult because of hydrogen generation proceeding in the negative electrode. Even when a battery is configured, for example, using the above-described active materials as the negative electrode active material, the average operating potential is less than 2 V. In this case, it is difficult for the battery to achieve a high energy density, and therefore, there is currently no aqueous secondary battery which has an energy density greater than that of the lead storage battery or the nickel hydrogen secondary battery.

Therefore, among aqueous lithium ion secondary batteries, attention is attracted to lithium-zinc secondary batteries, where used for a positive electrode is an oxide material into and out from which lithium is inserted and extracted, and used for a negative electrode a zinc metal. The theoretical capacity of the zinc metal is as large as 820 mAh/g. Therefore, the lithium-zinc secondary batteries having a combination of the negative electrode using the zinc metal and the positive electrode into and out from which lithium is inserted and extracted are anticipated as one of candidates for secondary batteries having high energy density among secondary batteries using an aqueous solution. However, dendrites are precipitated on the surface of the electrode during a zinc dissolution-precipitation reaction. Therefore, there is a problem in that life performance deteriorates due to an increase in overvoltage at the time of charge and discharge.

BRIEF DESCRIPTION OF THE DRAWINGS

FIG. 1 is a partially cutout cross-sectional view schematically showing an example of a secondary battery according to the first embodiment;

FIG. 6 is a perspective view schematically showing an example of a battery pack according to a third embodiment;

FIG. 9 is a cross-sectional view schematically showing an example of a vehicle according to a fourth embodiment;

FIG. 11 is a block diagram showing an example of a system including a stationary power supply according to a fifth embodiment.

DETAILED DESCRIPTION

Figure 2:
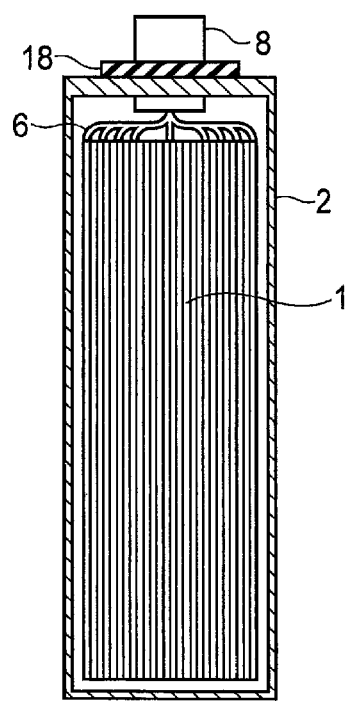
FIG. 2 is a side view of the secondary battery of FIG. 1.

According to one embodiment, provided is a lithium zinc secondary battery including a positive electrode, a negative electrode, an aqueous electrolyte, and a separator between the positive electrode and the negative electrode. The negative electrode includes a zinc-including metal body and an oxide on at least a part of a surface of the zinc-including metal body. The aqueous electrolyte includes zinc and a lithium salt. Zinc is dissolved and deposited at the negative electrode. Lithium is inserted and extracted from the oxide in a potential range of −1.4 V (vs. SCE) or more and −1.0 V (vs. SCE) or less. A specific surface area of the oxide is from 10 m$^2$/g or more and 350 m$^2$/g or less. A mol concentration ratio Zn/Li between the zinc and the lithium in the aqueous electrolyte is 1.0×10$^{-5}$ or more and 0.3 or less.

According to another embodiment, a battery pack including the secondary battery according to the above embodiment is provided.

According to still another embodiment, a vehicle including the battery pack according to the above embodiment is provided.

According to still another embodiment, a stationary power supply including the battery pack according to the above embodiment is provided.

Hereinafter, embodiments will be described with reference to the drawings. Note that the same reference numerals are given to common configurations throughout the embodiments, and redundant descriptions are omitted. In addition, each drawing is a schematic view for describing the embodiment and facilitating the understanding thereof, and there are some differences in shape, dimension, ratio, and the like from an actual device. These, however, may be changed as appropriate, considering the following description and known technology.

First Embodiment

The lithium zinc secondary battery according to a first embodiment includes a positive electrode, a negative electrode, an aqueous electrolyte, and a separator. The negative electrode includes a zinc-including metal body. The negative electrode includes plural oxides on at least a part of a surface of the zinc-including metal body. Dissolving and deposition of zinc occur at the negative electrode. The aqueous electrolyte includes zinc and a lithium salt. The separator is between the positive electrode and the negative electrode. Lithium is inserted into and extracted from the plural oxides in a potential range of −1.4 V (vs. SCE) or more and −1.0 V (vs. SCE) or less. A specific surface area of the oxide is 10 m$^2$/g or more and 350 m$^2$/g or less. A mol concentration ratio Zn/Li between the zinc and the lithium in the aqueous electrolyte is 1.0×10$^{-5}$ or more and 0.3 or less. Note, that the lithium zinc secondary battery may be referred to as "secondary battery", herein.

The positive electrode includes a positive electrode current collector and a positive electrode mixture layer disposed on the positive electrode current collector. The positive electrode mixture layer is provided on at least one surface of the positive electrode current collector. The negative electrode includes a zinc-including metal body and a negative electrode oxide layer. At least an oxide is provided in the negative electrode oxide layer. The zinc-including metal body refers to a member made of zinc or a member having zinc present on at least a part of a surface of an arbitrary metal body. At least a part of the surface of the zinc-including metal body is provided with a single species or plural species of oxides. In addition, zinc may be present together with the oxides on the surface of the zinc-including metal body. This zinc may be present on the surface of the zinc-including metal body in the state of particles. For example, the oxide may be present on the surface of the zinc-including metal body in the state of particles. Examples of the oxide may include a titanium oxide or a tungsten oxide. The negative electrode included in the secondary battery according to the present embodiment preferably includes at least one oxide selected from the group consisting of a titanium oxide and a tungsten oxide as the oxide.

Zinc refers to at least one selected from the group consisting of a sole metal, an oxide, a chloride, a nitrate, a sulfate, a basic carbonate compound, and a hydroxide of zinc. Zinc may also indicate two or more of these.

The zinc-including metal body provided in the negative electrode may serve as a current collector and an active material.

In the oxide contained in the negative electrode oxide layer, lithium is inserted at the time of charge. At this time, a self-discharge reaction accompanied by extraction of lithium progresses. In a case where the electrolyte does not include zinc, the self-discharge reaction of the secondary battery is problematic in that a reaction accompanied by generation of hydrogen due to decomposition of water proceeds. From such a circumstance, by applying a compound such as an oxide in the present embodiment, for which the Li insertion and extraction potential region is in vicinity of the dissolution-precipitation potential of zinc, precipitation of zinc can proceed more preferentially than generation of hydrogen. Since zinc is precipitated as described above, zinc can be present on at least a part of the surface of the oxide of the negative electrode, and the generation of hydrogen accompanying the extraction of lithium can be suppressed. For example, in a case where lithium chloride is used as a supporting salt as an example of the present embodiment, the reaction represented by the following formula 1 occurs with self-discharge. Therefore, the precipitation of zinc proceeds on the surface of the oxide such as a titanium oxide or a tungsten oxide, which are active materials in the negative electrode in the sense of lithium insertion and extraction. Namely, lithium is inserted into and extracted out from the titanium oxide and tungsten oxide.

$$\text{Li(intercalated)} + \tfrac{1}{2}\text{ZnCl}_2 \rightarrow \tfrac{1}{2}\text{LiCl} + \tfrac{1}{2}\text{Zn} \quad \text{(Formula 1)}$$

When zinc is present on the surface of the oxide, zinc is not present in a dendritic form. Zinc is present in the form of covering at least a part of the surface of the oxide. Therefore, the precipitation of dendrites on the surface of the oxide can be suppressed by having a zinc dissolution-precipitation reaction occur through self-discharge as in formula 1, as in the secondary battery according to the present embodiment. Furthermore, the presence of zinc in the form of covering the surface of the oxide makes it possible to suppress the generation of hydrogen. Therefore, the secondary battery according to the present embodiment can suppress the generation of hydrogen due to self-discharge and can suppress the precipitation of zinc dendrite on the surface of the negative electrode at the time of charge. Due to this, short-circuiting of the secondary battery at the negative electrode can be prevented. Therefore, stable charge and discharge become possible. Furthermore, the charge-discharge reaction involves a hybrid reaction of the dissolution-precipitation of zinc and the insertion-extraction reaction of lithium into/from oxide particles. From this, the charge and discharge can be performed in a potential region that is lower than the dissolution-precipitation potential of zinc, and the battery operating voltage of the cell can also be improved.

In addition, the precipitation of zinc also occurs in a current collecting portion such as an electro-conductive agent, a binder or a tab, and a lead of the negative electrode described below, and a portion of the zinc-including metal body that includes zinc and is not covered with the oxide. Therefore, the electro-conductive agent of the negative electrode or the surface of the zinc-including metal body may also be covered at least partially with zinc.

Materials for the respective members that can be used in the secondary battery according to the first embodiment will be described in detail.

1) Negative Electrode

The negative electrode includes a zinc-including metal body, and a negative electrode oxide layer disposed on the zinc-including metal body. The negative electrode oxide layer is disposed on at least one surface of the zinc-including metal body. For example, the negative electrode oxide layer may be disposed on one surface of the zinc-including metal body, or negative electrode oxide layers may be disposed on one surface of the zinc-including metal body and on a surface on the reverse side.

The negative electrode oxide layer preferably includes as an oxide, at least one selected from the group consisting of a titanium oxide and a tungsten oxide. The oxides may be used alone or as a mixture of several oxides. In the oxides, lithium insertion and extraction reaction occurs within a range of −1.4 V (vs. SCE) or more and −1.0 V (vs. SCE) or less relative to a Saturated Calomel Electrode. Therefore, when the oxides described above are used, the change in volume due to expansion and contraction accompanying charge and discharge is small, and thus long operation life can be realized.

The zinc-including metal body may, for example, be a metal foil. The zinc-including metal body may be a foil made of an alloy including at least one metal element A selected from the group consisting of Ga, In, Bi, Tl, Sn, Pb, Ti and Al, for example. Such a foil may include one of the above elements A, or alternatively, two or more of the above elements A, for example, in addition to Zn. Other than the foil, examples of the form of the zinc-including metal body include a mesh, a porous structure, and the like. In order to enhance energy density and output, the form of a foil having a small volume and a large surface area is desirable.

The zinc-including metal body preferably includes the element(s) A. These elements may be used alone or as a mixture of multiple elements, and may be included in the state of a metal or metal alloy. The metal and metal alloy may be included alone or as a mixture of two or more. When such element(s) A is included in the zinc-including metal body, the mechanical strength of the zinc-including metal body is increased and thus the processing thereof is improved. Further, the effect of suppressing the electrolysis of the aqueous solvent can be thereby suppress the hydrogen generation is increased. Of the elements described above, Pb, Ti and Al are more preferable.

Further, the zinc-including metal body may include a substrate containing a metal different from Zn and elements A. In such a case, the hydrogen generation can be suppressed by the presence of a compound containing Zn or element(s) A on at least a part of the surface of the substrate. The compound containing Zn or element(s) A present on the surface is desirably disposed so as to be in contact with the negative electrode oxide layer. For example, Zn or element(s) A can be made present on the surface of the substrate by plating Zn or element(s) A on the substrate. Alternatively, it is possible to perform plating treatment using an alloy containing Zn or element(s) A on the surface of the substrate.

The substrate preferably includes at least one metal selected from the group consisting of Al, Fe, Cu, Ni, and Ti. The metals may be included in the state of an alloy. The substrate may include the metal or metal alloy alone or as a mixture of two or more. The substrate preferably includes Al, Ti, or an alloy thereof, from the perspective of weight reduction.

The zinc-including metal body may contain a compound of at least one selected from the group consisting of the elements A. Oxides of the elements A, hydroxides of the elements A, basic carbonate compounds of the elements A, and/or sulfate compounds of the elements A may be further coated on the surface of the zinc-including metal body. In the case of coating, it is preferable for the surface of the metal body to be uniformly coated, and the film thickness to be 1 nm or more and 100 μm or less.

An example of the oxide of zinc includes ZnO, an example of the hydroxide of zinc includes $Zn(OH)_2$, an example of the basic carbonate compound of zinc includes $2ZnCO_3 \cdot 3Zn(OH)_2$, and an example of the sulfate compound of zinc includes $ZnSO_4 \cdot 7H_2O$, and the like.

When at least one of an oxide of the element A, a hydroxide of the element A, a basic carbonate compound of the element A, and a sulfate compound of the element A is present on the surface of the zinc-including metal body, hydrogen generation can be suppressed. In addition, when these compounds are present on the surface of the zinc-including metal body, the adhesion between the zinc-including metal body and the oxide is improved, enabling an increase in paths for electronic conduction. Therefore, it is possible to improve the cycle performance and reduce the electrical resistance.

Whether or not any compound including element(s) A is contained in the zinc-including metal body, can be examined by disassembling the battery as described below and then conducting inductively coupled plasma (ICP) emission spectrometry.

The battery can be disassembled as follows. For example, after the secondary battery, having undergone the initial charge, is discharged, this battery is disassembled and the negative electrode is taken out. The negative electrode having been taken out is washed with pure water for 30 minutes, and then vacuum-dried for 24 hours in an environment at a temperature of 80° C. After drying, the temperature is returned to 25° C. and the negative electrode is taken out.

The thickness of the zinc-including metal body may be arbitrarily set as appropriate.

The oxide is preferably one selected from a titanium oxide and a tungsten oxide. Lithium is inserted into and extracted from such oxides in a potential region of −1.4 V (vs. SCE) or more and −1.0 V (vs. SCE) or less. That is, the potential at which lithium is inserted into and extracted from these oxides is close to the dissolution-precipitation potential of zinc. Therefore, the hybrid reaction of the insertion and extraction of lithium and the dissolution and precipitation of zinc can be performed. Tungsten oxide has, for example, a monoclinic structure and includes a compound represented by a composition formula $WO_{3-x}$, where $0 \leq x \leq 0.2$. Titanium oxide includes, for example, a compound represented by composition formula $TiO_{2-x}$, where x is $0 \leq x \leq 0.2$. Examples of titanium oxide include titanium oxide having a monoclinic structure, titanium oxide having a rutile structure, and titanium oxide having an anatase structure. For the titanium oxide of each crystal structure, the composition before charging can be represented by $TiO_2$, and the composition after charging can be represented by $Li_xTiO_2$, where x is $0 \leq x \leq 1$. The structure before charging for the titanium oxide having the monoclinic structure can be represented by $TiO_2(B)$. When anatase titanium oxide is used, since the capacity during lithium insertion and extraction is large, the amount of self-discharge reaction can also be increased. Therefore, anatase titanium oxide is more preferable, as the amount of precipitation of zinc can be increased and the capacity of the negative electrode can be increased.

The potential region of the oxide is measured as follows.

The insertion-extraction potential of lithium can be measured as follows. A three-electrode cell having a saturated calomel electrode as a reference electrode is constructed and cyclic voltammetry measurement (CV measurement) is performed thereon. The insertion-extraction potential of lithium is obtained by examining a position of a peak attributable to the insertion-extraction potential of lithium by the CV measurement. For the measurement condition, for example, an electrolyte having the same mol concentration of lithium as the electrolyte concentration prepared for the secondary battery is used, and the measurement is performed with the conditions having a LiCl salt as the supporting salt and a sweeping rate of 10 mV/sec.

In addition to the titanium oxide and/or the tungsten oxide described above, one compound selected from the group consisting of a lithium titanium oxide and a lithium titanium composite oxide may be included, or two or more of the compounds may be included. For the lithium titanium oxide or the lithium titanium composite oxide, the lithium insertion-extraction reaction proceeds in the potential region that is lower than the potential region of dissolution and precipitation of zinc. Therefore, by mixing such a compound with the titanium oxide and the tungsten oxide, for example, the compound can be expected to be used for controlling a sharp potential change due to over-charge on the negative electrode side during charge.

Examples of the lithium titanium composite oxide include a niobium titanium oxide and a sodium niobium titanium oxide. The compounds desirably have a Li insertion potential in a range of 1 V (vs. Li/Li$^+$) or more and 3 V (vs. Li/Li$^+$) or less.

Examples of the lithium titanium oxide include a lithium titanium oxide having a spinel structure (for example, the general formula: $Li_{4+x}Ti_5O_{12}$ wherein x is $-1 \leq x \leq 3$), a lithium titanium oxide having a ramsdellite structure (for example, $Li_{2+x}Ti^3O_7$ wherein $-1 \leq x \leq 3$), $Li_{1+x}Ti_2O_4$ wherein $0 \leq x \leq 1$, $Li_{1.1+x}Ti_{1.8}O_4$ wherein $0 \leq x \leq 1$, $Li_{1.07+x}Ti_{1.86}O_4$ wherein $0 \leq x \leq 1$, and $Li_xTiO_2$ wherein $0 < x \leq 1$), and the like. The lithium titanium oxide includes, for example, a lithium titanium composite oxide in which a dopant is introduced into the above lithium titanium oxide having the spinel structure or the ramsdellite structure.

Examples of the niobium titanium oxide include oxides represented by $Li_aTiM_bNb_{2+\beta}O_{7\pm\sigma}$ wherein $0 \leq a \leq 5$, $0 \leq b \leq 0.3$, $0 \leq \beta \leq 0.3$, $0 \leq \sigma \leq 0.3$, and M includes at least one selected from the group consisting of Fe, V, Mo, and Ta.

Examples of the sodium niobium titanium oxide include an orthorhombic Na-containing niobium titanium composite oxide represented by the general formula $Li_{2+v}Na_{2-w}M1_xTi_{6-y-z}Nb_yM2_zO_{14+\delta}$ wherein $0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 includes at least one selected from the group consisting of Cs, K, Sr, Ba, and Ca, and M2 includes at least one selected from the group consisting of Zr, Sn, V, Ta, Mo, W, Fe, Co, Mn, and Al.

Preferable compounds that may be included in addition to the aforementioned titanium oxide and tungsten oxide include the lithium titanium oxide having the spinel structure. The lithium titanium oxide of spinel structure is more preferable because a Li insertion potential thereof is of 1.4 V (vs. Li/Li+) or more and 2 V (vs. Li/Li+) or less, and thus, when combined with a lithium manganese oxide as the positive electrode active material, for example, a high electromotive force can be obtained, and further because the spinel lithium titanium oxide has a change in volume due to the charge-discharge reaction that is very small.

The composition of an oxide included in the negative electrode can be analyzed using Inductively Coupled Plasma (ICP) emission spectrometry. In order to measure the composition of the oxide according to ICP emission spectrometry, the following procedure is specifically performed.

First, according to the previously described procedure, a negative electrode is taken out from a secondary battery, and washed. The washed electrode is put, for example, into ethyl methyl carbonate in a glass beaker, and by vibrating with an ultrasonic washing machine, a negative electrode oxide layer can be separated from a zinc-including metal body. Next, the separated negative electrode oxide layer is dried under reduced pressure. The obtained negative electrode oxide layer is pulverized using a mortar or the like, thereby becoming a powder including the target oxide, electro-conductive agent, binder, and the like. By dissolving the powder in an acid, a liquid sample including the oxide can be prepared. Here, hydrochloric acid, nitric acid, sulfuric acid, hydrogen fluoride, and the like may be used as the acid. The components in the active material can be specified by subjecting the liquid sample to ICP analysis.

In addition, whether or not the oxide includes at least one of a titanium oxide and a tungsten oxide can be examined as follows. The peak position is observed by X-ray diffraction measurement. It is examined whether the observed peak positions match with the peak positions derived from the crystal structures of the titanium oxide and the tungsten oxide in an X-ray diffraction database.

The oxide may be included in the negative electrode oxide layer in the form of particles. The negative electrode oxide may be singular primary particles, secondary particles in which each of the secondary particles include agglomerated primary particles, or a mixture of singular primary particles and secondary particles. The shape of the particles is not particularly limited and, for example, may be a spherical shape, an elliptic shape, a flat shape, a fiber shape, or the like.

It is preferable for an average particle size (a diameter) of the secondary particles of the oxide to be 3 μm or more, and more preferably to be 5 μm or more and 20 μm or less. When the size is within this range, the surface area of the oxide is small, and thus the effect of suppressing the hydrogen generation can be increased.

The negative electrode oxide having the secondary particles whose average particle size is 3 μm or more can be obtained, for example, by the following method. First, starting materials for the oxide are subjected to synthetic reaction to produce an oxide precursor having an average particle size of 1 μm or less. After that, the oxide precursor is subjected to a firing treatment, followed by a pulverization treatment using a pulverizing apparatus such as a ball mill or a jet mill. Next, by a firing treatment, the oxide precursors are agglomerated and grown into secondary particles having a large particle size.

The average primary particle size of the oxide included in the negative electrode is preferably 0.01 μm or more and 0.1 μm or less. When the average primary particle size of the oxide is within this range, it is possible to reduce the precipitation diameter of zinc dendrite. Therefore, it is possible to suppress an increase in overvoltage or short-circuiting due to precipitation of dendrites. In addition, a state close to an amorphous state is obtained by having the crystallite size of the oxides be 1 nm or more and 50 nm or less. Since electric potential concentration can thereby be suppressed, precipitation of dendrites can be further suppressed. The crystallite size can be calculated by the Scherrer equation, and is calculated from the main peak observed by wide angle X-ray scattering measurement in electrode or oxide powder.

The specific surface area of the oxide in the BET method due to precipitation of $N_2$ is preferably in a range of 10 $m^2/g$ or more and 350 $m^2/g$ or less. Since there is thus increase in the reaction surface, the deposition area of zinc on the surface of the oxide increases. Therefore, since dendritic precipitation can be further suppressed and the amount of zinc precipitated is increased, the capacity of the secondary battery is increased. When the specific surface area is less than 10 $m^2/g$, since there is not much reaction surfaces capable of dissolving and precipitating zinc, enough discharge capacity cannot be obtained and dendrite is easily formed, which is not preferable. In addition, when the specific surface area is more than 350 $m^2/g$, the oxide becomes amorphous. In this case, since the framework structure of the oxide collapses, the insertion and extraction of lithium cannot be reversibly progressed, which is not preferable. In addition, a more preferable range of the specific surface area is 10 $m^2/g$ or more and 300 $m^2/g$ or less. This is because a sufficient area for promoting the zinc precipitation-dissolution reaction can be secured, and reversible zinc precipitation-dissolution reaction can proceed while suppressing precipitation of dendrite.

In addition, the negative electrode oxide layer may be a porous layer including a negative electrode oxide, an electro-conductive agent, and a binder, which are supported on the zinc-including metal body.

For the measurement of the specific surface area of the oxide, a method is used by which molecules, for which an occupied area in adsorption is known, are adsorbed onto the surface of powder particles at a temperature of liquid nitrogen, and the specific surface area of the sample is determined from the amount of adsorbed molecules. The most commonly used is the BET method based on low-temperature and low-humidity physical adsorption of an inert gas. The BET method is based on the BET theory, which is the most famous theory as a method of calculating the specific surface area where the Langmuir theory, which is a monomolecular layer adsorption theory, has been extended to multi-molecular layer adsorption. The specific surface area determined by the above method is referred to as a "BET specific surface area".

The following method is performed when the specific surface area is examined by extracting oxide from the negative electrode of the secondary battery. First, the negative electrode is extracted from the secondary battery and sufficiently washed. Next, the negative electrode oxide layer is flaked off from the extracted negative electrode. The flaked off negative electrode oxide layer is pulverized in a mortar to make a powder. The obtained powder is measured by the BET method. At this time, when the content of the electro-conductive agent or the binder is large, there is a possibility that the value of the specific surface area of the oxide included in the negative electrode cannot be obtained accurately. In such a case, for example, it is preferable to dissolve the binder by using a solvent in which the binder is soluble and separate the subordinate agents by using centrifugal separation, when performing evaluation. At this time, care should be taken not to alter the surface shape of the oxide. The change in the surface shape due to the separation treatment and whether the separation is sufficiently performed can be determined by using a scanning electron microscope (SEM) and a transmission electron microscope (TEM).

The porosity of the negative electrode (excluding the zinc-including metal body) is desirably in a range of 20% to 50%, whereby a negative electrode having excellent affinity between the negative electrode and the electrolyte and having high density can be obtained. The porosity is more preferably in a range of 25% to 40%.

The electro-conductive agent may include carbon materials such as acetylene black, carbon black, coke, carbon fiber, and graphite, and powders of a metal such as nickel or zinc. The electro-conductive agent may be used alone or as a mixture of two or more agents. It is desirable to use the metal powder as the electro-conductive agent, because hydrogen is generated from the carbon material itself.

The binder may include, for example, polytetrafluoroethylene (PTFE), polyvinylidene fluoride (PVdF), fluororubber, ethylene-butadiene rubber, polypropylene (PP), polyethylene (PE), carboxymethyl cellulose (CMC), polyimide (PI), polyacrylimide (PAI), and the like. The binder may be used alone or as a mixture of two or more binders.

With respect to the mixing ratio of the oxide, the electro-conductive agent, and the binder in the negative electrode oxide layer, it is preferable that the oxide is included in a range of 70% by weight or more and 95% by weight or less, the electro-conductive agent is included in a range of 3% by weight or more and 20% by weight or less, and the binder is included in a range of 2% by weight or more and 10% by weight or less. When the mixing ratio of the electro-conductive agent is 3% by weight or more, the electro-conductivity of the negative electrode can be made good, and when the mixing ratio is 20% by weight or less, the degradation of the electrolyte on the surface of the electro-conductive agent can be reduced. When the mixing ratio of the binder is 2% by weight or more, sufficient electrode strength can be obtained, and when the mixing ratio is 10% by weight or less, the insulating portions within the electrode can be reduced.

The negative electrode can be produced, for example, by the following method. First, oxide, electro-conductive agent, and binder are dispersed in an appropriate solvent to prepare a slurry. The resulting slurry is coated onto the zinc-including metal body, and the coat of applied slurry is dried to form the negative electrode oxide layer on the zinc-including metal body. Here, for example, the slurry may be coated onto one side of the zinc-including metal body, or may be coated onto one surface of the zinc-including metal body and a surface on the reverse side. Then, the zinc-including metal body and the negative electrode oxide layer are subjected to pressing, for example, by heat pressing, whereby the negative electrode can be produced.

2) Positive Electrode

The positive electrode may include a positive electrode current collector, and a positive electrode active material layer supported on one surface or both of reverse surfaces of the positive electrode current collector, where the positive electrode mixture layer (positive electrode active material-containing layer) includes an active material, an electro-conductive agent, and a binder.

It is preferable to use a foil, porous structure, or mesh made of a metal such as stainless steel, Al, or Ti as the positive electrode current collector. In order to prevent corrosion of the current collector caused by the reaction of the current collector with the electrolyte, the surface of the current collector may be covered with another element. In addition, zinc may be included.

As the positive electrode active material, there may be used a material capable of having lithium and sodium be inserted and extracted. The positive electrode may include one kind of positive electrode active material, or include two or more kinds of positive electrode active materials. Examples of the positive electrode active material include a lithium manganese composite oxide, a lithium nickel composite oxide, a lithium cobalt aluminum composite oxide, a lithium nickel cobalt manganese composite oxide, a spinel lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ wherein $0≤x≤1$, or $Li_xMnPO_4$ wherein $0≤x≤1$), and the like. The phosphate compound having an olivine crystal structure has excellent thermal stability.

Examples of the positive electrode active material with which a high positive electrode potential can be obtained are described below. Examples include lithium manganese composite oxides such as $Li_xMn_2O_4$ having a spinel structure wherein $0<x≤1$, or $Li_xMnO_2$ wherein $0<x≤1$; a lithium nickel aluminum composite oxide such as $Li_xNi_{2-y}Al_yO_2$ wherein $0<x≤1$ and $0<y≤1$; lithium cobalt composite oxides such as $Li_xCoO_2$ wherein $0<x≤1$; lithium nickel cobalt composite oxides such as $Li_xNi_{1-y-z}Co_yMn_zO_2$ wherein $0<x≤1$, $0<y≤1$, and $0≤z≤1$; lithium manganese cobalt composite oxides such as $Li_xMn_yCo_{1-y}O_2$ wherein $0<x≤1$ and $0<y≤1$; spinel lithium manganese nickel composite oxides such as $Li_xMn_{2-y}Ni_yO_4$ wherein $0<x≤1$ and $0<y<2$; lithium phosphates having an olivine structure such as $Li_xFePO_4$ wherein $0≤x≤1$, $Li_xFe_{1-y}Mn_yPO_4$ wherein $0<x≤1$ and $0≤y≤1$, or $Li_xCoPO_4$ wherein $0<x≤1$; fluorinated iron sulfates such as $Li_xFeSO_4F$ wherein $0<x≤1$, and the like.

Further examples of the positive electrode active material include sodium manganese composite oxide, sodium nickel composite oxide, sodium cobalt composite oxide, sodium nickel cobalt manganese composite oxide, sodium iron composite oxide, sodium phosphate compounds (for example, sodium iron phosphate and sodium vanadium phosphate), sodium iron manganese composite oxide, sodium nickel titanium composite oxide, sodium nickel iron composite oxide, and sodium nickel manganese composite oxide.

Examples of a preferable positive electrode active material include iron composite oxides (for example, $Na_yFeO_2$, wherein $0≤y≤1$), iron manganese composite oxides (for example, $Na_yFe_{1-x}Mn_xO_2$, wherein $0<x<1$, $0≤y≤1$), nickel titanium composite oxide (for example, $Na_yNi_{1-x}Ti_xO_2$, wherein $0<x<1$, $0≤y≤1$), a nickel iron composite oxide (for example, $Na_yNi_{1-x}Fe_xO_2$, wherein $0<x<1$, $0≤y≤1$), nickel-manganese composite oxide (for example, $Na_yNi_{1-x}Mn_xO_2$, wherein $0<x<1$, $0≤y≤1$), nickel manganese iron composite oxide (for example, $Na_yNi_{1-x-z}Mn_xFe_zO_2$, wherein $0<x<1$, $0≤y≤1$, $0<z<1$, $0<1-x-z<1$), iron phosphate (for example, $Na_yFePO_4$, wherein $0≤y≤1$).

The particle of the positive electrode active material may be singular primary particles, secondary particles in which each of the secondary particles include agglomerated primary particles, and a mixture of both the singular primary particles and the secondary particles. The primary particles of the positive electrode active material preferably have an average particle size (a diameter) of 10 μm or less, more preferably from 0.1 μm to 5 μm. The secondary particles of the positive electrode active material preferably have an average particle size (a diameter) of 100 μm or less, more preferably from 10 μm to 50 μm.

It is preferable that at least a part of the particle surface of the positive electrode active material is covered with a carbon material. The carbon material may be in the form of a layered structure, a particulate structure, or a form of agglomerated particles.

As the electro-conductive agent for increasing the electron conductivity of the positive electrode mixture layer and suppressing the contact resistance between the positive electrode mixture layer and the current collector, examples include acetylene black, carbon black, graphite, carbon fiber having an average fiber diameter of 1 μm or less, and the like. The electro-conductive agent may be used alone or as a mixture of two or more agents.

The binder for binding the active material to the electro-conductive agent include, for example, polytetrafluoroethylene (PTFE), polyvinylidene fluoride (PVdF), fluororubber, ethylene-butadiene rubber, styrene-butadiene rubber (SER), polypropylene (PP), polyethylene (PE), carboxymethyl cellulose (CMC), polyimide (PI), and polyacrylimide (PAI). The binder may be used alone or as a mixture of two or more binders.

With respect to the mixing ratio of the positive electrode active material, the electro-conductive agent, and the binder in the positive electrode mixture layer, it is preferable that the positive electrode active material is included in a range of 70% by weight or more and 95% by weight or less, the electro-conductive agent is included in a range of 3% by weight or more and 20% by weight or less, and the binder is included in a range of 2% by weight or more and 10% by weight or less. When the mixing ratio of the electro-conductive agent is 3% by weight or more, the electro-conductivity of the positive electrode can be made good, and when the mixing ratio is 20% by weight or less, the degradation of the electrolyte on the surface of the electro-conductive agent can be reduced. When the mixing ratio of the binder is 2% by weight or more, sufficient electrode strength can be obtained, and when the mixing ratio is 10% by weight or less, the insulating portions within the electrode can be reduced.

The positive electrode can be produced, for example, by the following method. First, positive electrode active material, electro-conductive agent, and binder are dispersed in an appropriate solvent to prepare a slurry. The resulting slurry is coated onto the current collector, and the coat of applied slurry is dried to form the positive electrode mixture layer on the current collector. Here, for example, the slurry may be coated onto one side of the current collector, or may be coated onto one surface of the current collector and a surface on the reverse side. Then, the current collector and the positive electrode active material layer are subjected to pressing, for example, by heat pressing, whereby the positive electrode can be produced.

In addition, the positive electrode mixture layer may include zinc in a state of particles.

3) Electrolyte

Examples of the electrolyte include an electrolyte containing zinc, a lithium salt, and an aqueous solvent, and a gel electrolyte obtained by combining a polymer material in this electrolyte. Such an electrolyte may be referred to as "aqueous electrolyte", herein. The aforementioned polymer material includes, for example, polyvinylidene fluoride (PVdF), polyacrylonitrile (PAN), polyethylene oxide (PEO), and the like. The electrolyte will be described here. The form of zinc may be a sole metal. Alternatively, the form of zinc may be one or a combination of two or more selected from the group consisting a sole metal, oxides, chlorides, sulfides, nitrates, sulfates, and hydroxides. Further, the zinc may be included in the electrolyte as an ion, or as a solid.

As the lithium salt, there may be used a substance that becomes dissociated and thus generates an anion when the substance is dissolved in an aqueous solvent. In particular, preferable are lithium salts that dissociate into Li ion(s) and the anion. Such lithium salts include, for example, $LiNO_3$, LiCl, $Li_2SO_4$, LiOH, and the like.

The lithium salt that dissociates into Li ion(s) and the anion has a relatively high solubility in aqueous solvents. For that reason, there can be obtained an electrolyte, in which the anion concentration is of a high concentration of from 1 M to 10 M, and thus having favorable Li ion diffusibility.

An electrolyte containing $NO_3^-$ and/or $Cl^-$ may be used in a wide anion concentration range of about 0.1 M to 10 M. From the perspective of fulfilling both ion conductivity and lithium equilibrium potential, the anion concentration is preferably of a high concentration of from 3 M to 12 M. It is more preferable that the anion concentration of the electrolyte containing $NO_3^-$ or $Cl^-$ is from 8 M to 12 M.

An electrolyte containing $LiSO_4^-$ and/or $SO_4^{2-}$ may be used in an anion concentration range of about 0.05 M to 2.5 M. From the perspective of ion conductivity, the anion concentration is preferably of a high concentration of from 1.5 M to 2.5 M.

The $OH^-$ concentration in the electrolyte is desirably from $10^{-10}$ M to 0.1 M. The electrolyte may contain at least one anion selected from the group consisting of $NO_3^-$, $LiSO_4^-$, $SO_4^{2-}$, and $OH^-$. The electrolyte may contain one of these anions, or alternatively, two or more anions may be included. In order to distinguish an electrolyte as used for generically naming the electrolyte as solution and the gel electrolyte, from an electrolyte as a solute (e.g., the lithium salt), the electrolyte as the solute may be referred to as a first electrolyte for the sake of convenience.

As the aqueous solvent, a solution including water may be used. Here, the solution including water may be pure water, or alternatively, a mixed solution or a mixed solvent of water and materials other than water.

In the above-described electrolyte, the amount of water solvent (for example, amount of water in the aqueous solvent) is preferably 1 mol or more, based on 1 mol of salt as solute. The amount of water solvent is more preferably 3.5 mol or more, based on 1 mol of salt as solute.

The electrolyte may contain both lithium ions and sodium ions.

It is preferable that the electrolyte has a pH of 4 or more and 13 or less. When the pH is less than 4, since the electrolyte would be acidic, degradation of the active material is apt to progress. When the pH is more than 13, since there is decrease in an overvoltage for oxygen generation at the positive electrode, electrolysis of the aqueous solvent is apt to progress.

The solute in the electrolyte, i.e., the first electrolyte can be determined qualitatively and quantitatively, for example, by ion chromatography. Ion chromatography is particularly preferable as the analysis method because of high sensitivity.

Examples of specific measurement conditions for the qualitative and quantitative analysis of the solute included in the electrolyte according to ion chromatography are shown below:
System: Prominence HIC-SP
Analysis Column: Shim-pack IC-SA3
Guard Column: Shim-pack IC-SA3 (G)
Eluent: 3.6 mmol/L, aqueous sodium carbonate solution
Flow Rate: 0.8 mL/minute
Column Temperature: 45° C.
Injection Amount: 50 μL
Detection: electric conductivity Whether or not water is included in the electrolyte can be examined by gas chromatography—mass spectrometry (GC-MS) measurement. Water content in the electrolyte can be calculated, for example, from emission spectrometry using ICP, or the like. In addition, the mole numbers of the solvent can be calculated from the measurement of specific weight of the electrolyte. The same electrolyte may be used on the positive electrode side and the negative electrode side, or different electrolytes may be used. When different electrolytes are respectively used on the positive electrode side and the negative electrode side, the pH of the electrolyte of the positive electrode is preferably 1 or more and 7 or less. When the pH of the electrolyte of the positive electrode is 8 or more, the oxygen generation reaction resulting from electrolysis of water progresses advantageously, which is not preferable. When the pH is 1 or less, degradation of the active material proceeds, which is not preferable. The pH of the electrolyte of the negative electrode is preferably 7 or greater. When the pH of the electrolyte is less than 7, the hydrogen generation reaction due to the electrolysis of water advantageously advances, which is not preferable.

An additive can be added to the electrolyte. For example, a metal including zinc can be added. In a case where the metal zinc is used as an additive (added metal) to the electrolyte, when the concentration of the metal contained in the electrolyte becomes excessive, a zinc precipitation reaction due to electrodeposition becomes greater than a zinc precipitation reaction accompanied by self-discharge. Therefore, care should be taken not to make the metal concentration in the electrolyte excessive. In order to add the additive, the additive may be added as a sole metal or oxide powder when preparing the slurry of the negative electrode, the additive may be added to the electrolyte, or both may be used at the same time. In addition, when zinc is included in the current collector or a container described later, an additive may be used in combination. The form of the metal to be added may be a sole metal. Alternatively, the form of the metal to be added may be one selected from the group consisting of oxides, chlorides, sulfides, nitrates, sulfates, and hydroxides. The form of the metal to be added may be combination of two or more among these. The added metal can be examined by ICP.

In the electrolyte, the mole concentration ratio Zn/Li between zinc and lithium contained in the aqueous electrolyte is $1.0 \times 10^{-5}$ or more and 0.3 or less. When Zn/Li=0.3 or less, lithium insertion occurs in the charge process preferentially over the precipitation of zinc. As a result, the precipitation of zinc accompanying the self-discharge process proceeds in a form such as of a covering preferentially over a dendritic form, and therefore, the precipitation of zinc dendrites can be suppressed. More preferably, the mol concentration ratio Zn/Li between zinc and lithium is $1.0 \times 10^{-4}$ or more and 0.1 or less. When the mol concentration ratio Zn/Li is less than $1.0 \times 10^{-5}$, the zinc concentration is too small relative to the lithium concentration. Therefore, it is difficult to smoothly dissolve and precipitate zinc. In addition, when the mol concentration ratio Zn/Li is larger than 0.3, the zinc concentration is too large relative to the lithium concentration. Therefore, dendrites easily precipitate due to electrodeposition of zinc, which is not preferable.

The upper limit of the current value during the charge of the secondary battery is preferably 1 C or less, and more preferably 0.5 C or less. At a current value exceeding 1 C, balance cannot be maintained between Li insertion and precipitation of zinc accompanying self-discharge, and proceeding of Li insertion dominates. On the other hand, the amount of the self-discharge reaction during the charge can be increased by setting the current value to be low. By doing so, the amount of zinc precipitated with the negative electrode self-discharge during the charge can be increased. As a result, it is possible to increase the charge capacity due to the zinc precipitation of the negative electrode.

4) Separator

A separator may be disposed between the positive electrode and the negative electrode. When the separator is made from an insulating material, it is possible to prevent electrical contact between the positive electrode and the negative electrode. In addition, it is desirable to use a separator having a shape that allows the electrolyte to be capable of migrating between the positive electrode and the negative electrode. Examples of the separator include a non-woven, a film, a paper, and the like. Examples of the material forming the separator may include polyolefin such as polyethylene and polypropylene, and cellulose. Preferable examples of the separator include a non-woven including cellulose fiber and a porous film including a polyolefin fiber. The separator preferably has a porosity of 60% or more. The fiber diameter is preferably 10 μm or less. When the fiber diameter is 10 μm or less, the affinity of the separator with the electrolyte is improved, thus resulting in decreased battery resistance. The more preferable range of the fiber diameter is 3 μm or less. The cellulose-including non-woven having a porosity of 60% or more can be well impregnated with the electrolyte, and can exhibit a high output performance at a low temperature to a high temperature. In addition, even during storage for a long time in a charged state, during float charging, or when exposed to overcharge, the separator does not react with the negative electrode, and short-circuiting between the negative electrode and the positive electrode caused by precipitation of dendrites of the lithium metal does not occur. The more preferable range is from 62% to 80%.

A solid electrolyte may also be used as the separator. As the separator, oxides having lithium ion conductivity, such as LATP ($Li_{1+x}Al_xTi_{2-x}(PO_4)_3$, where $0.1 \leq x \leq 0.4$) having a NASICON framework, amorphous LIPON (e.g., $Li_{2.9}PO_{3.3}N_{0.46}$), and garnet LLZ (e.g., $Li_7La_3Zr_2O_{12}$) are preferable. By including such a solid electrolyte, it is possible to maintain separator strength and it is possible to suppress an internal short-circuiting due to dendrite precipitation. Therefore, it is possible to further increase the life.

The examples of solid electrolyte also include β alumina, $Na_{1+x}Zr_2Si_xP_{3-x}O_{12}$ ($0 \leq x \leq 3$), and $NaAlSi_3O_8$.

The separator preferably has a thickness of 20 μm or more and 200 μm or less, and a density of from 0.2 g/cm³ or more and 0.9 g/cm³ or less. Within these ranges, the mechanical strength and the reduction of battery resistance can be well-balanced, and a secondary battery having a high output and having suppressed internal short-circuiting can be provided. In addition, there is little thermal contraction of the separator under a high temperature environment, and favorable high temperature storage properties can be expressed.

5) Container Member

As a container member for housing the positive electrode, negative electrode, and electrolyte, there may be used, a container made of metal, a container made of laminate film, a container made of resin, such as polyethylene or polypropylene.

As the container made of metal, a metal can made of nickel, iron, stainless steel, or zinc and having an angular or cylindrical shape may be used.

The container made of resin and the container made of metal desirably have a wall thickness within a range of 1 mm or less, and more preferably 0.5 mm or less. An even more preferable range is 0.3 mm or less. The lower limit of the wall thickness is desirably 0.05 mm.

The laminate film includes, for example, a multilayer film in which a metal layer is covered with resin layers, and the like. Examples of the metal layer include a stainless steel foil, an aluminum foil, and an aluminum alloy foil. A polymer such as polypropylene (PP), polyethylene (PE), nylon, and polyethylene terephthalate (PET) may be used for the resin layer. The laminate film preferably has a thickness of 0.5 mm or less, more preferably 0.2 mm or less. The lower limit of the thickness of the laminate film is desirably 0.01 mm.

In addition, zinc may be included in the container. The "including" used herein indicates such configurations where, for example, the container is formed of zinc itself, the container is formed of a zinc-including alloy, and applying zinc to the interior of the container or coating zinc in the interior of the container, to allow the zinc and electrolyte to be able to come into contact.

The secondary battery according to the embodiment may be applied to secondary batteries of various forms such as an angular shaped form, cylindrical shaped form, a flat-form, a thin-form, or a coin-form. The secondary battery preferably has a bipolar structure, whereby there is an advantage in that a cell having plural electrode units connected in series can be produced with a single cell.

Examples of a secondary battery according to the embodiment is explained with reference to FIG. 1 to FIG. 4.

One example of a secondary battery using a container made of metal is shown in FIG. 1 and FIG. 2.

FIG. 1 is a partially cutout cross-sectional view schematically showing a secondary battery according to the embodiment. FIG. 2 is a side view of the battery in FIG. 1. More specifically, FIG. 2 is a cross-sectional view along the II-II line of the angular secondary battery shown in FIG. 1.

The electrode group 1 is housed in a rectangular-tube-shaped metal container 2. The electrode group 1 has a structure in which the positive electrode 3, the negative electrode 4, and the separator 5 disposed therebetween are spirally wound in a manner such that a flat shape is obtained. An electrolyte (not shown) is held in the electrode group 1. As shown in FIG. 2, a belt-shaped positive electrode lead 6 is electrically connected to each of plural positions on the edge of the positive electrode 3 located on the end surface of the electrode group 1. A belt-shaped negative electrode lead 7 is electrically connected to each of plural positions on the edge of the negative electrode 4 located on the end surface. The plural positive electrode leads 6 are bundled into one, and electrically connected to a positive electrode electro-conduction tab 8. A positive electrode terminal is composed from the positive electrode leads 6 and the positive electrode electro-conduction tab 8. The negative electrode leads 7 are bundled into one, and connected to a negative electrode electro-conduction tab 9. A negative electrode terminal is composed from the negative electrode leads 7 and the negative electrode electro-conduction tab 9. A metal sealing plate 10 is fixed over an opening of the metal container 2 by welding or the like. The positive electrode electro-conduction tab 8 and the negative electrode electro-conduction tab 9 are respectively drawn out to the outside through outlets provided on the sealing plate 10. A positive electrode gasket 18 and a negative electrode gasket 19 are respectively disposed on the inner periphery surface of each outlet of the sealing plate 10 in order to avoid short circuits due to contact between the positive electrode electro-conduction tab 8 and sealing plate 10, and due to contact between the negative electrode electro-conduction tab 9 and sealing plate 10. The airtightness of the angular secondary battery can be maintained by disposing the positive electrode gasket 18 and the negative electrode gasket 19.

A control valve 22 (safety valve) is disposed in the sealing plate 10. In the case where the internal pressure of a battery cell is increased due to gas generated by electrolysis of an aqueous solvent, it is possible to diffuse the generated gas from the control valve 22 to the outside. The control valve 22 to be used is, for example, a return control valve which operates when the internal pressure becomes higher than a set value and which functions as a sealing plug when the internal pressure decreases. Alternatively, a non-return valve may be used, where once it is operated, its function as the sealing plug is not recovered. In FIG. 1, the control valve 22 is disposed in the center of the sealing plate 10, but the control valve 22 may be located at the end of the sealing plate 10. The control valve 22 may be omitted.

An injection port 23 is formed in the sealing plate 10. An electrolyte may be poured in through the injection port 23. The injection port 23 is closed by a sealing plug 24 after pouring in the electrolyte. The injection port 23 and the sealing plug 24 may be omitted.

Figure 3:
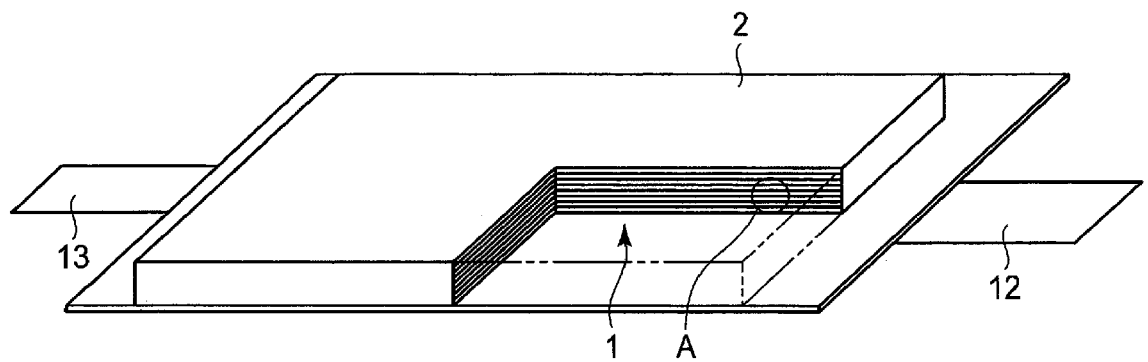
FIG. 3 is a partially cutout perspective view schematically showing another example of the secondary battery according to the first embodiment.
Figure 4:
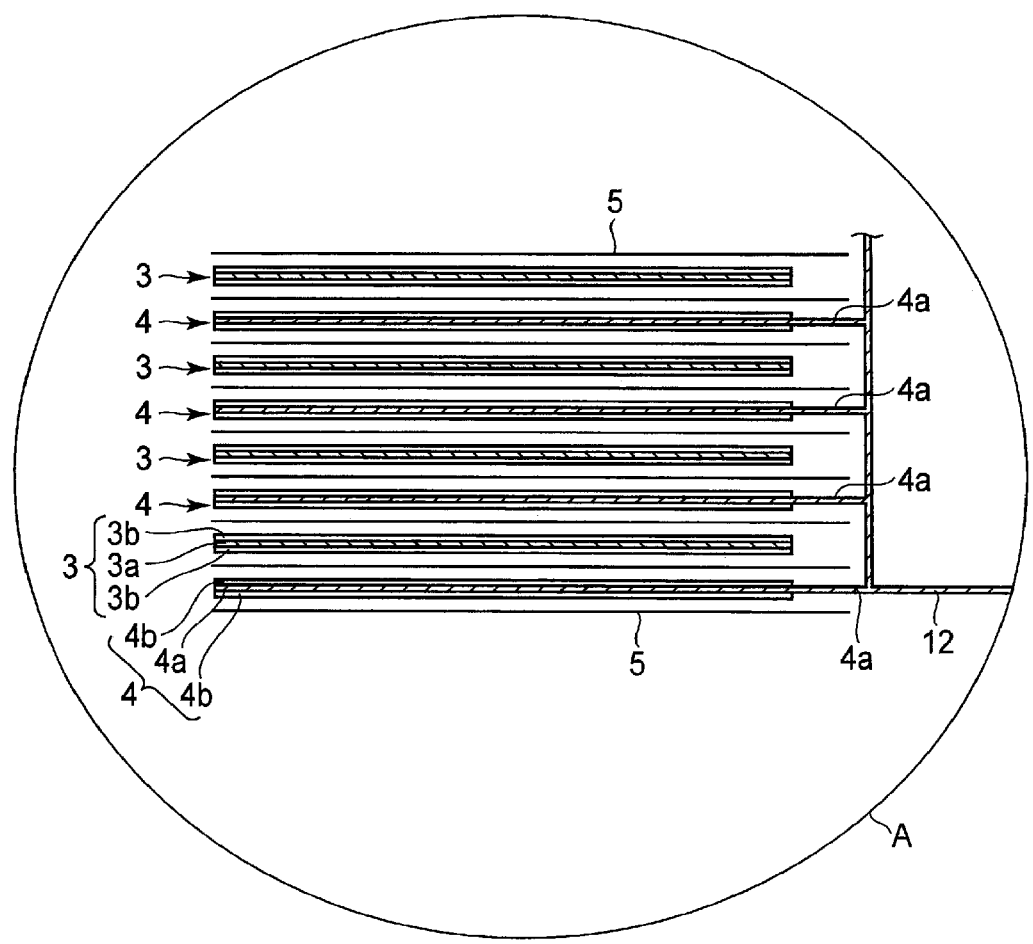
FIG. 4 is an enlarged cross-sectional view of section A in FIG. 3.

One example of a secondary battery using a container member made of the laminate film is shown in FIG. 3 and FIG. 4.

A stacked electrode group 1 is housed in a bag-form container 2. The bag-form container 2 is made of a laminate film where a metal layer is sandwiched between two resin films. As shown in FIG. 4, the stacked electrode group 1 has a structure in which positive electrodes 3 and negative electrodes 4 are alternately stacked with a separator 5 sandwiched therebetween. The electrode group 1 includes plural positive electrodes 3. Each of the plural positive electrodes 3 includes a current collector 3a, and positive electrode active material-containing layers 3b formed on both of reverse surfaces of the positive electrode current collector 3a. The electrode group 1 includes plural negative electrodes 4. Each of the plural negative electrodes 4 includes a zinc-including metal body 4a, and negative electrode oxide-containing layers 4b formed on both of reverse surfaces of the zinc-including metal body 4a. An end of the zinc-including metal body 4a of each of the negative electrodes 4 protrudes out beyond the positive electrodes 3. The protruded zinc-including metal body 4a is electrically connected to a belt-shaped negative electrode terminal 12. The distal end of the belt-shaped negative electrode terminal 12 is extended out from the container 2. Although not shown in the drawings, an end of the current collector 3a of the positive electrode 3 protrudes beyond the negative electrodes 4 at the side opposed to the protruded end of the zinc-including metal body 4a. The current collectors 3a protruding beyond the negative electrodes 4 are electrically connected to a belt-shaped positive electrode terminal 13. The distal end of the belt-shaped positive electrode terminal 13 is positioned on the opposite side from the negative electrode terminal 12, and extends out from a side of the container 2.

There may be provided a safety valve for releasing hydrogen gas that has generated within the container to the outside, also for the secondary batteries shown in FIG. 3 and FIG. 4. As the safety valve, either one of a return format valve, which operates when an internal pressure becomes higher than a pre-determined value and functions as a sealing plug when the internal pressure is reduced, and a non-return format valve, which does not recover its function as the sealing plug once it is operated, can be used. Although the secondary batteries shown in FIG. 1 to FIG. 4 are sealed batteries, an open battery is possible, in the case that a circulation system for converting hydrogen gas into water is included.

According to the above embodiment, the lithium zinc secondary battery is a secondary battery that includes a positive electrode, a negative electrode at which zinc is dissolved and deposited and which includes a zinc-including metal body and oxides on a part of a surface of the zinc-including metal body, an aqueous electrolyte including zinc and a lithium salt, and a separator present between the positive electrode and the negative electrode. Lithium is inserted and extracted from the oxides in a potential range of −1.4 V (vs. SCE) or more and −1.0 V (vs. SCE) or less, a specific surface area of the oxides is 10 $m^2/g$ or more and 350 $m^2/g$ or less, and a mol concentration ratio Zn/Li between the zinc and the lithium in the aqueous electrolyte is $1.0 \times 10^{-5}$ or more and 0.3 or less. By being such a secondary battery, hydrogen generation accompanying self-discharge can be suppressed and precipitation of zinc dendrite on the surface of the negative electrode at the time of the charge can be suppressed. Thereby, short-circuiting of the secondary battery at the negative electrode can be prevented. Therefore, stable charge and discharge is possible, and the secondary battery having high cycle life performance can be provided.

Second Embodiment

According to a second embodiment, a battery module including a secondary battery as a single-battery is provided. As the secondary battery, a lithium zinc secondary battery according to the first embodiment may be used.

Examples of the battery module include a battery module including plural single-batteries as structural units where single-batteries are electrically connected in series or in parallel in each structural unit, a battery module including a unit structured by plural single-batteries that are electrically connected in series or a unit structured by plural single-batteries that are electrically connected in parallel, and the like.

The battery module may be housed in a housing. As the housing, a metal can formed of aluminum alloy, iron, stainless steel, or the like, a plastic container, or the like may be used. The container desirably has a wall thickness of 0.5 mm or more.

Examples of the aspect in which the plural secondary batteries are electrically connected in series or in parallel include an aspect in which the plural secondary batteries each has a container and are electrically connected in series or in parallel, and an aspect in which plural electrode groups are housed in the same housing and are electrically connected in series or in parallel. Specific examples of the former are those in which positive electrode terminals and negative electrode terminals of plural secondary batteries are connected via metal bus bars (for example, aluminum, nickel, or copper). Specific examples of the latter include an aspect in which plural electrode groups are housed in one housing in a state of being electrochemically insulated from each other by partitions, and these electrode groups are electrically connected to each other in series. When the number of batteries that are electrically connected in series is in a range of 5 to 7, voltage compatibility with a lead storage battery becomes good. In order to further increase the voltage compatibility with the lead storage battery, a structure in which 5 or 6 single-batteries are connected in series is preferable.

Figure 5:
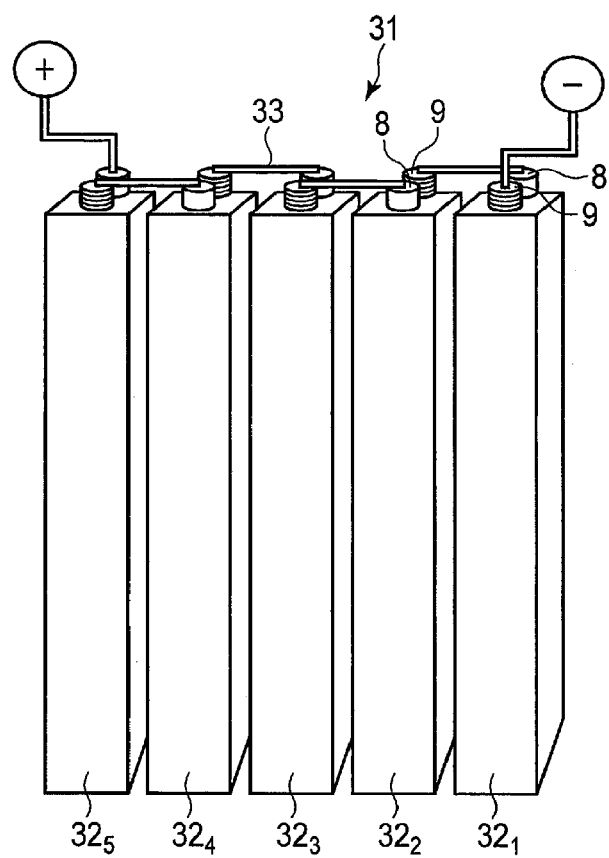
FIG. 5 is a perspective view schematically showing an example of a battery module according to a second embodiment.

One example of the battery module is explained with reference to FIG. 5. A battery module 31, shown in FIG. 5, includes plural angular secondary batteries $32_1$ to $32_5$ according to the first embodiment (for example, FIG. 1 or FIG. 2) as single-batteries. A positive electrode electro-conduction tab 8 of battery $32_1$ and a negative electrode electro-conduction tab 9 of battery $32_2$ positioned adjacent thereto, are electrically connected by a lead 33. Further, a positive electrode electro-conduction tab 8 of the battery $32_2$ and a negative electrode electro-conduction tab 9 of battery $32_3$ positioned adjacent thereto, are electrically connected through a lead 33. In this manner, the batteries $32_1$ to $32_5$ are connected in series.

According to the battery module according to the second embodiment, by including the secondary battery according to the first embodiment, there can be provided a battery module having high cycle life performance.

Third Embodiment

According to a third embodiment, a battery pack is provided. The battery pack includes the lithium zinc secondary battery according to the first embodiment.

The battery pack according to the third embodiment may include one or more secondary batteries (single-batteries) according to the first embodiment described above. The plural secondary batteries, which may be included in the battery pack according to the third embodiment, may be electrically connected to each other in series, in parallel or in a combination of in series and in parallel. The plural secondary batteries may be electrically connected to structure a battery module. In the case of structuring a battery module from plural secondary batteries, the battery module according to the second embodiment may be used.

The battery pack according to the third embodiment may further include a protective circuit. The protective circuit has a function of controlling the charge and discharge of the secondary battery (or secondary batteries). Alternatively, a circuit included in equipment that uses the battery pack as a power source (for example, an electronic device, a vehicle such as an automobile, or the like) may be used as the protective circuit of the battery pack.

Moreover, the battery pack according to the third embodiment may further include an external power distribution terminal. The external power distribution terminal is configured to externally output current from the secondary battery and/or to input current into a single-battery. In other words, when the battery pack is used as a power source, the current is externally provided through the external power distribution terminal. When the battery pack is charged, the charge current (including a regenerative energy of motive force of a vehicle such as an automobile, or the like) is provided to the battery pack through the external power distribution terminal.

An example of the battery pack according to the third embodiment is explained with reference to FIG. 6. FIG. 6 is a schematic perspective view showing one example of the battery packs.

A battery pack 40 includes a battery module including, for example, the secondary battery shown in FIGS. 3 and 4. The battery pack 40 includes a housing 41, and a battery module 42 housed in the housing 41. In the battery module 42, plural (for example, five) secondary batteries $43_1$ to $43_5$ are electrically connected in series. The secondary batteries $43_1$ to $43_5$ are stacked in a thickness direction. The housing 41 has an opening 44 on each of an upper portion and four side surfaces. The side surfaces, from which the positive and negative electrode terminals 12 and 13 of the secondary batteries $43_1$ to $43_5$ protrude, are exposed through the opening 44 of the housing 41. A positive electrode terminal 45 for output of the battery module 42 is belt-shaped, and one end thereof is electrically connected to any or all of the positive electrode terminals 13 of the secondary batteries $43_1$ to $43_5$, and the other end protrudes beyond the opening 44 of the housing 41 and thus protrudes past the upper portion of the housing 41. On the other hand, a negative electrode terminal 46 for output of the battery module 42 is belt-shaped, and one end thereof is electrically connected to any or all of the negative electrode terminals 12 of the secondary batteries $43_1$ to $43_5$, and the other end protrudes beyond the opening 44 of the housing 41 and thus protrudes past the upper portion of the housing 41.

Figure 7:
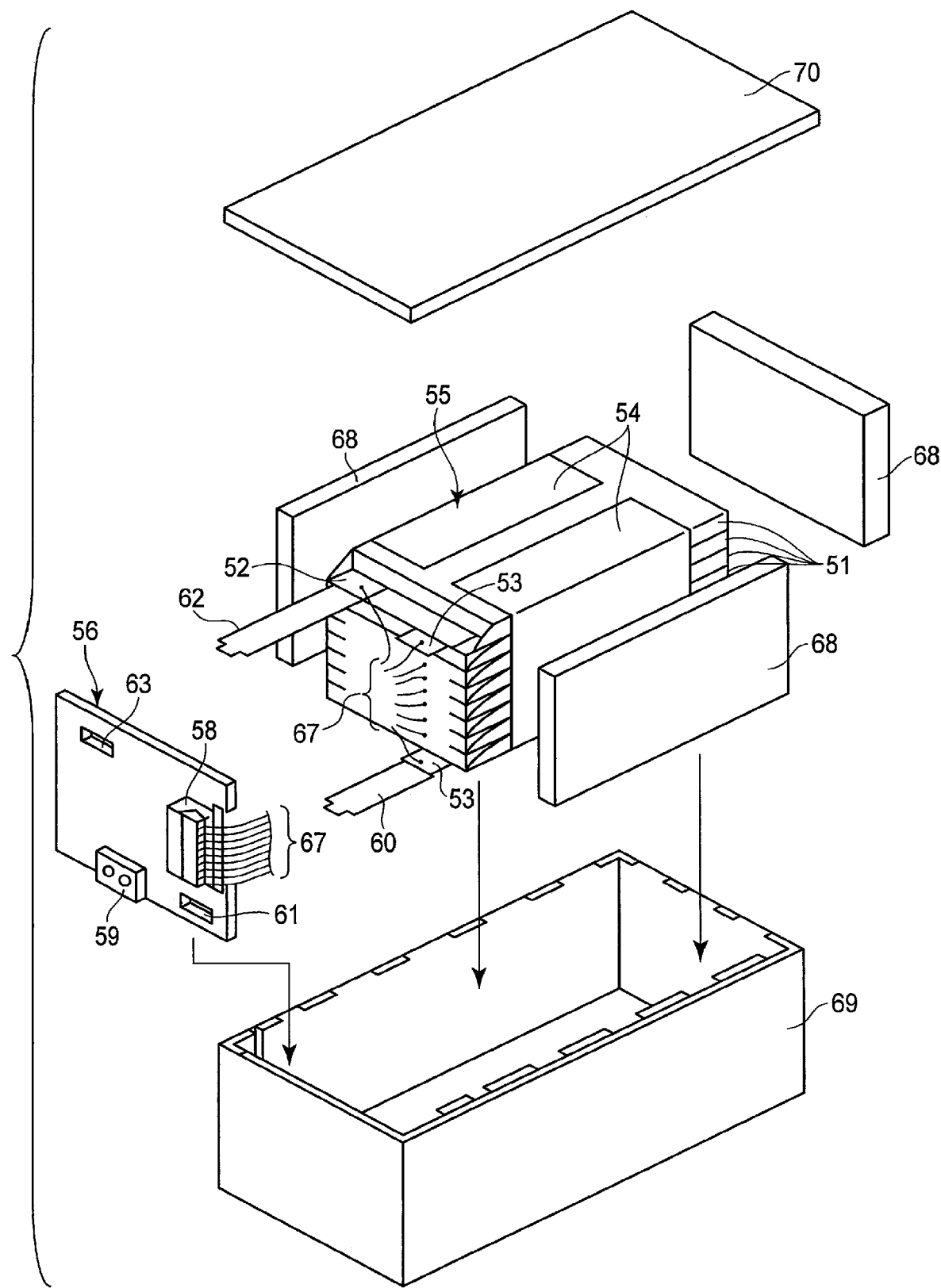
FIG. 7 is an exploded perspective view schematically showing another example of the battery pack according to the third embodiment.
Figure 8:
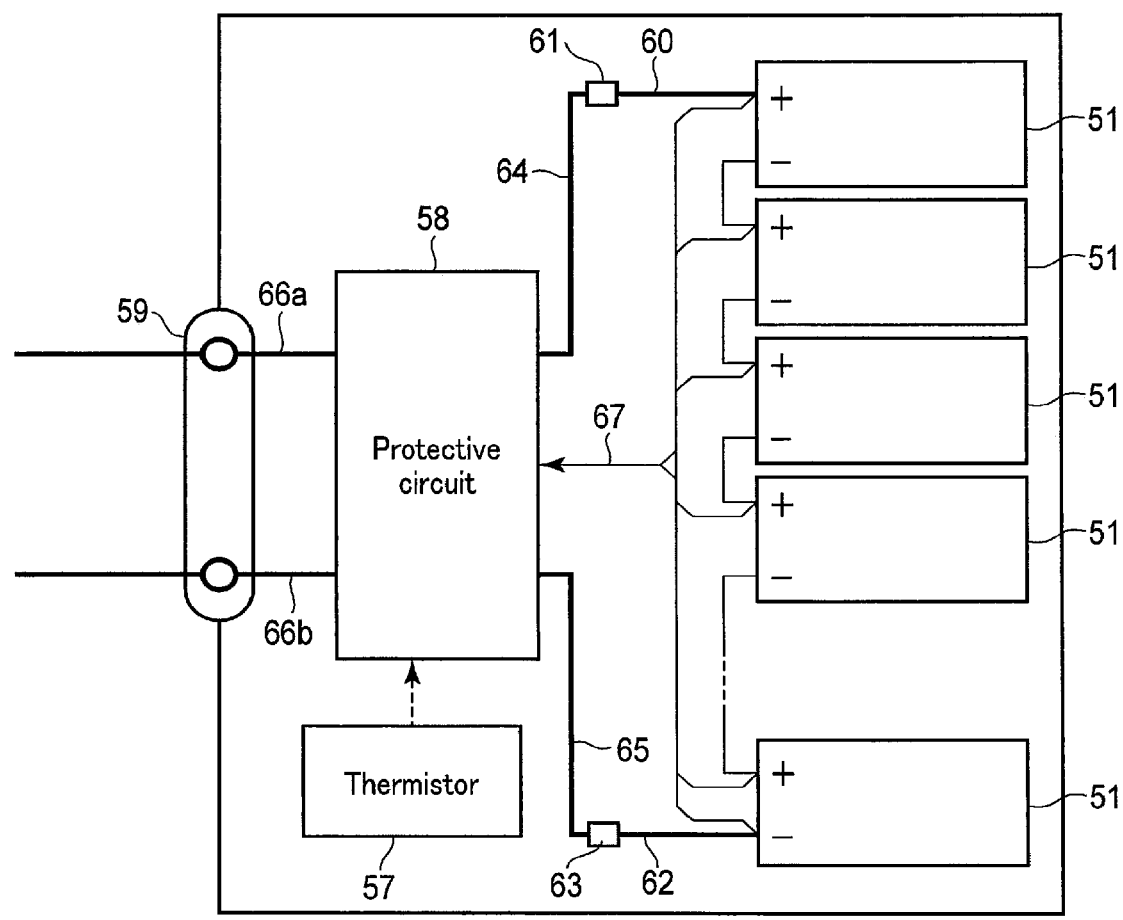
FIG. 8 is a block diagram showing an electric circuit of the battery pack shown in FIG. 7.

Another example of the battery pack according to the third embodiment is explained in detail with reference to FIG. 7 and FIG. 8. FIG. 7 is an exploded perspective view showing another example of the battery pack according to the third embodiment. FIG. 8 is a block diagram showing an electric circuit of the battery pack in FIG. 7.

Plural single-batteries 51, i.e. flat secondary batteries, are stacked such that externally extending negative electrode terminals 52 and positive electrode terminals 53 are arranged in the same direction, and the resulting stack is fastened with an adhesive tape 54 to form a battery module 55. The single-batteries 51 are electrically connected to each other in series, as shown in FIG. 8.

A printed wiring board 56 is disposed facing the side surfaces of the single-batteries 51 from which the negative electrode terminals 52 and the positive electrode terminals 53 extend out. A thermistor 57, a protective circuit 58, and an external power distribution terminal 59 are mounted on the printed wiring board 56, as shown in FIG. 8. An electrically insulating plate (not shown) is attached to the surface of the printed wiring board 56 facing the battery module 55 to avoid unnecessary connection with wirings of the battery module 55.

A positive electrode lead 60 is connected to a positive electrode terminal 53 located lowermost in the battery module 55, and the distal end of the lead 60 is inserted into a positive electrode-side connector 61 on the printed wiring board 56 and thus electrically connected to the connector. A negative electrode lead 62 is connected to a negative electrode terminal 52 located uppermost in the battery module 55, and the distal end of the lead 62 is inserted into a negative electrode-side connector 63 on the printed wiring board 56 and thus electrically connected to the connector. The connectors 61 and 63 are connected to the protective circuit 58 through wirings 64 and 65 formed on the printed wiring board 56.

The thermistor 57 detects the temperature of the single-batteries 51, and the detection signals are sent to the protective circuit 58. The protective circuit 58 can shut off a plus wiring (positive electrode-side wiring) 66a and a minus wiring (negative electrode-side wiring) 66b between the protective circuit 58 and the external power distribution terminal 59 under predetermined conditions. A predetermined condition is, for example, the case where the temperature detected by the thermistor 57 becomes a predetermined temperature or higher. Another example of the predetermined condition is the case when the over-charge, over-discharge or over-current of the single-battery (single-batteries) 51 is detected. The detection of the over-charge, or the like, is performed for each individual single-battery 51 or for the battery module 55. When each individual single-battery 51 is detected, the battery voltage may be detected, or the positive electrode potential or negative electrode potential may be detected. In the latter case, a lithium electrode, which is used as a reference electrode, is inserted into each individual single-battery 51. In the case of FIG. 7 and FIG. 8, wires 67 for voltage detection is connected to each of the single-batteries 51, and the detected signals are sent to the protective circuit 58 through the wires 67.

Protective sheets 68, made of rubber or resin, are arranged on three side planes of the battery module 55 aside from the side plane where the positive electrode terminals 53 and the negative electrode terminals 52 protrude out.

The battery module 55 is housed in a housing container 69 together with the protective sheets 68 and the printed wiring board 56. That is, the protective sheets 68 are arranged on both internal surfaces along a long side direction and one internal surface along a short side direction of the housing container 69, and the printed wiring board 56 is disposed on the opposite internal surface along the short side direction. The battery module 55 is located in a space surrounded by the protective sheets 68 and the printed wiring board 56. A lid 70 is attached to the upper surface of the housing container 69.

In order to fix the battery module 55, a heat-shrinkable tape may be used instead of the adhesive tape 54. In such a case, the battery module is fastened by placing the protective sheets on both side surfaces of the battery module, revolving the heat-shrinkable tape around the battery module, and thermally shrinking the heat-shrinkable tape.

In FIGS. 7 and 8, an aspect has been shown in which the single-batteries 51 are connected in series; however, in order to increase the battery capacity, the cells may be connected in parallel. Alternatively, the connection in series and the connection in parallel may be combined. Furthermore, assembled battery packs may be connected to each other in series and/or in parallel.

The aspect of the battery pack may be appropriately changed depending on the application thereof. The battery pack can be suitably used in applications having demand for charge and discharge at large current. Specifically the battery pack may be used, for example, as a power source of a digital camera, as an onboard battery for installing in a vehicle such as a two-wheeled to four-wheeled hybrid electric automobile, a two-wheeled to four-wheeled electric automobile, a power-assisted bicycle, or a railway car, or as a stationary battery. In particular, the battery pack is suitably used onboard a vehicle.

In a vehicle, such as an automobile, onto which the battery pack according to the third embodiment has been installed, the battery pack is configured, for example, to recover regenerative energy from motive force of the vehicle. The vehicle may include a mechanism configured to convert kinetic energy of the vehicle into regenerative energy.

According to the battery pack according to the third embodiment described above, by including the secondary battery according to the first embodiment, there can be provided a battery pack having high cycle life performance.

Fourth Embodiment

According to a fourth embodiment, a vehicle is provided. The vehicle includes the battery pack according to the third embodiment.

In the vehicle according to the fourth embodiment, the battery pack is configured, for example, to recover regenerative energy from motive force of the vehicle. The vehicle according to the fourth embodiment may include a mechanism (regenerator) for converting kinetic energy of the vehicle into regenerative energy.

Examples of the vehicle according to the fourth embodiment include two-wheeled to four-wheeled hybrid electric automobiles, two-wheeled to four-wheeled electric automobiles, power-assisted bicycles, and railway cars.

In the vehicle according to the fourth embodiment, the installing position of the battery pack is not particularly limited. For example, when installing the battery pack on an automobile, as an example of the vehicle, the battery pack may be installed in the engine compartment of the vehicle, in rear parts of the vehicle, or under seats.

An example of the vehicle according to the fourth embodiment is explained below, with reference to the drawings.

FIG. 9 is a cross-sectional view schematically showing an example of a vehicle according to the fourth embodiment.

A vehicle 200, shown in FIG. 9 includes a vehicle body 201 and a battery pack 202. The battery pack 202 may be the battery pack according to the third embodiment.

The vehicle 200, shown in FIG. 9, is a four-wheeled automobile. As the vehicle 200, for example, a two-wheeled to four-wheeled hybrid electric automobile, a two-wheeled to four-wheeled electric automobile, a power-assisted bicycle, or railway car may be used.

The vehicle 200 may include plural battery packs 202. In that case, the battery packs 202 may be connected to each other in series or in parallel. The connection may be a combination of the connection in series and the connection in parallel.

The battery pack 202 is installed in an engine compartment located at the front of the vehicle body 201. The position at which the battery pack 202 is installed is not particularly limited. The battery pack 202 may be installed in rear sections of the vehicle body 201, or under a seat. The battery pack 202 may be used as a power source of the vehicle 200. The battery pack 202 can also recover regenerative energy of motive force of the vehicle 200.

Figure 10:
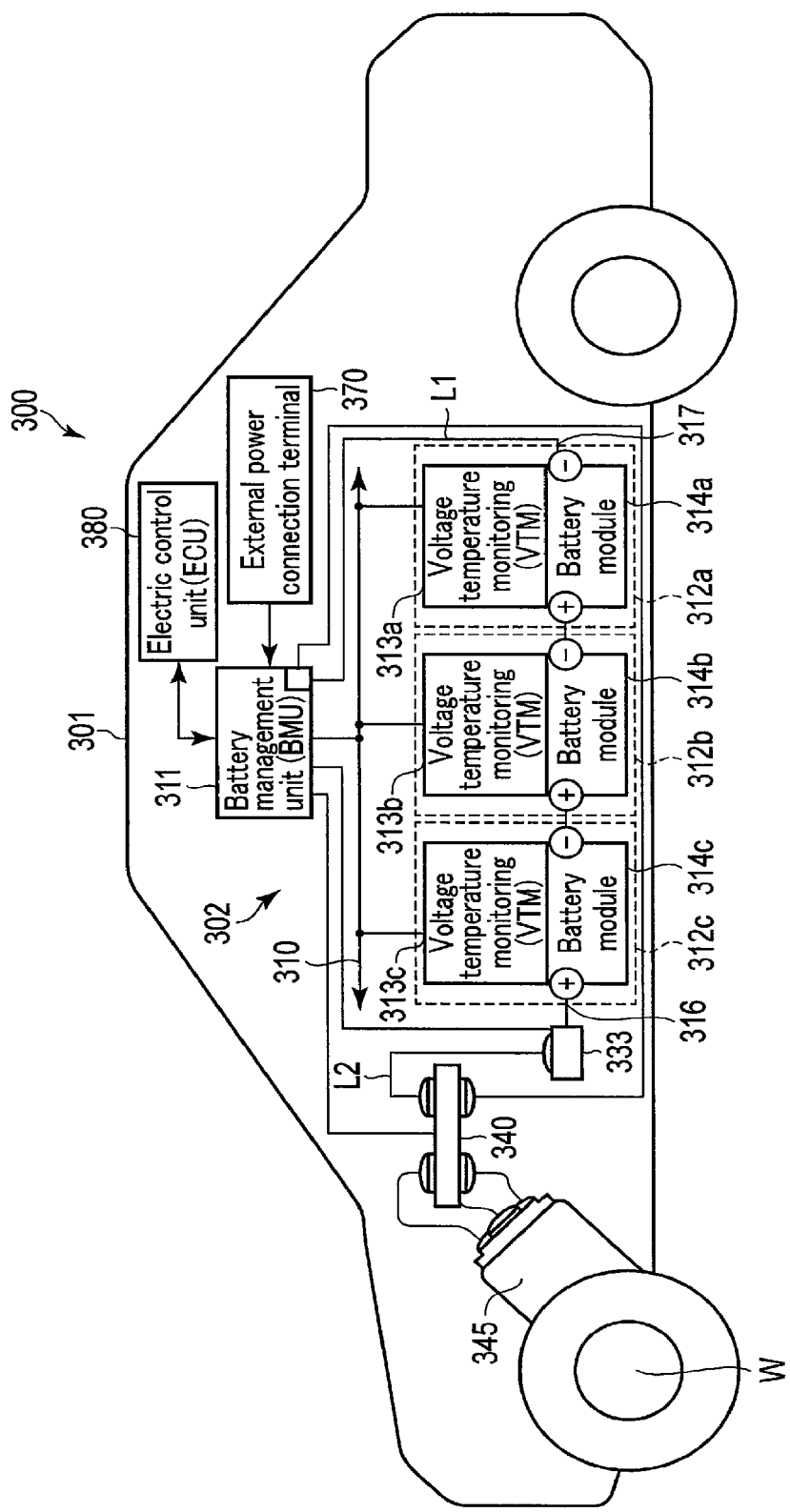
FIG. 10 is a diagram schematically showing another example of the vehicle according to the fourth embodiment.

Next, with reference to FIG. 10, an aspect of operation of the vehicle according to the fourth embodiment is explained.

FIG. 10 is a view schematically showing another example of the vehicle according to the fourth embodiment. A vehicle 300, shown in FIG. 10, is an electric automobile.

The vehicle 300, shown in FIG. 10, includes a vehicle body 301, a vehicle power source 302, a vehicle ECU (electric control unit) 380, which is a master controller of the vehicle power source 302, an external terminal (an external power connection terminal) 370, an inverter 340, and a drive motor 345.

The vehicle 300 includes the vehicle power source 302, for example, in an engine compartment, in the rear sections of the automobile body, or under a seat. In FIG. 10, the position of the vehicle power source 302 installed in the vehicle 300 is schematically shown.

The vehicle power source 302 includes plural (for example, three) battery packs 312a, 312b and 312c, a battery management unit (BMU) 311, and a communication bus 310.

The three battery packs 312a, 312b and 312c are electrically connected in series. The battery pack 312a includes a battery module 314a and a voltage temperature monitoring (VTM) 313a as a battery module monitoring unit. The battery pack 312b includes a battery module 314b, and a VTM 313b as a battery module monitoring unit. The battery pack 312c includes a battery module 314c, and a VTM 313c as a battery module monitoring unit. The battery packs 312a, 312*b* and 312*c* can each be independently removed, and may be exchanged by a different battery pack.

Each of the battery modules 314*a* to 314*c* includes plural single-batteries connected to each other in series. At least one of the plural single-batteries is the secondary battery according to the first embodiment. The battery modules 314*a* to 314*c* each perform charging and discharging through a positive electrode terminal 316 and a negative electrode terminal 317.

In order to collect information concerning security of the vehicle power source 302, the battery management unit 311 performs communication with the VTMs 313*a* to 313*c* and collects information such as voltages or temperatures of the single-batteries included in the battery modules 314*a* to 314*c* included in the vehicle power source 302.

The communication bus 310 is connected between the battery management unit 311 and the VTMs 313*a* to 313*c*. The communication bus 310 is configured so that multiple nodes (i.e., the battery management unit and one or more VTM) share a set of communication lines. The communication bus 310 is, for example, a communication bus configured based on CAN (Control Area Network) standard.

The VTMs 313*a* to 313*c* measure a voltage and a temperature of each single-battery in the battery modules 314*a* to 314*c* based on commands communicated from the battery management unit 311. It is possible, however, to measure the temperatures only at several points per battery module, and the temperatures of all of the single-batteries need not be measured.

The power source for vehicle 302 may also have an electromagnetic contactor (for example, a switch unit 333 shown in FIG. 10) for switching on and off electrical connection between the positive electrode terminal 316 and the negative electrode terminal 317. The switch unit 333 includes a precharge switch (not shown), which is turned on when charging of the battery modules 314*a* to 314*c* is performed, and a main switch (not shown), which is turned on when output is supplied to a load from the battery modules 314*a* to 314*c*. Each of the precharge switch and the main switch include a relay circuit (not shown), which is turned on or off based on a signal provided to a coil disposed near the switch elements.

The inverter 340 converts an inputted direct current voltage to a three-phase alternate current (AC) high voltage for driving a motor. Three phase output terminal(s) of the inverter 340 is (are) connected to each three-phase input terminal of the drive motor 345. An output voltage of the inverter 340 is controlled based on control signals from the battery management unit 311 or the vehicle ECU 380, which controls the entire operation of the vehicle 300.

The drive motor 345 is rotated by electric power supplied from the inverter 340. The rotation is transferred to an axle and driving wheels W via a differential gear unit, for example.

The vehicle 300 also includes a regenerative brake mechanism (i.e., a regenerator), though not shown. The regenerative brake mechanism rotates the drive motor 345 when the vehicle 300 is braked, and converts kinetic energy into regenerative energy, as electric energy. The regenerative energy, recovered in the regenerative brake mechanism, is inputted into the inverter 340 and converted into direct current. The direct current is inputted into the vehicle power source 302.

One terminal of a connecting line L1 is connected via a current detector (not shown) in the battery management unit 311 to the negative electrode terminal 317 of the vehicle power source 302. The other terminal of the connecting line L1 is connected to a negative electrode input terminal of the inverter 340.

One terminal of a connecting line L2 is connected through the switch unit 333 to the positive electrode terminal 316 of the vehicle power source 302. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 302, such as a remaining capacity of the vehicle power source 302, are transferred between the battery management unit 311 and the vehicle ECU 380 via communication lines.

The vehicle according to the fourth embodiment includes the battery pack according to the third embodiment. The vehicle according to the fourth embodiment, therefore, is excellent in cycle life performance, by virtue including the battery pack having high life performance. Furthermore, since the battery pack has excellent life performance, a vehicle of high reliability can be provided.

Fifth Embodiment

According to a fifth embodiment, a stationary power supply is provided. The stationary power supply includes a battery pack according to the third embodiment. Note that instead of a battery pack according to the third embodiment, the stationary power supply may have a battery module according to the second embodiment or a lithium zinc secondary battery according to the first embodiment installed therein.

The stationary power supply according to the fifth embodiment includes a battery pack according to the third embodiment. Therefore, the stationary power supply according to the fifth embodiment can realize long life.

FIG. 11 is a block diagram showing an example of a system including a stationary power supply according to the fifth embodiment. FIG. 11 is a diagram showing an application example to stationary power supplies 112, 123 as an example of use of battery packs 40A, 40B according to the third embodiment. In the example shown in FIG. 11, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 40A is installed in the stationary power supply 112. The battery pack 40A can store electric power and the like supplied from the electric power plant 111. In addition, the stationary power supply 112 can supply the electric power stored in the battery pack 40A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 40A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 40B is installed in the stationary power supply 123. The customer side EMS 121 performs control to stabilize the customer side electric power system 113.

Electric power from the electric power plant 111 and electric power from the battery pack 40A are supplied to the customer side electric power system 113 through the electric power network 116. The battery pack 40B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 40B.

Note that the electric power stored in the battery pack 40B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

Examples are explained below, but the embodiments are not limited to examples described below.

EXAMPLES

Although the above embodiments will be explained below in more detail by examples, the present disclosure is not limited to the examples described below, so long as the scope thereof is not departed.

Example 1

For a positive electrode, lithium manganese oxide ($LiMn_2O_4$) particles having a spinel structure were used as a positive electrode active material. In the $LiMn_2O_4$ particles, primary particles and secondary particles were mixed, and the average secondary particle size of the $LiMn_2O_4$ particles was 5 µm. 3% by weight of a vapor grown carbon fiber having a fiber diameter of 0.1 µm and 5% by weight of graphite powder were prepared as electro-conductive agents based on the entire positive electrode, and 5% by weight of polytetrafluoroethylene (PTFE) was prepared as a binder based on the entire positive electrode. The electro-conductive agents and the binder were mixed with the positive electrode active material and dispersed in N-methyl-2-pyrrolidone to prepare a slurry. The obtained slurry was applied onto both faces of a titanium foil having a thickness of 10 µm. After the slurry coating film was dried, through a pressing step, a positive electrode in which a thickness of a positive electrode active material-containing layer per each face was 43 µm and an electrode density was 2.2 g/cm³ was prepared.

As a negative electrode, a zinc negative electrode obtained as follows was used. A metal body of sole zinc having a thickness of 200 µm was prepared. A slurry containing anatase titanium oxide as an oxide was prepared. The slurry was uniformly coated onto both surfaces of the metal body so that there was no exposed portion on the zinc metal body. After that, the slurry was rolled. Thus, obtained was the zinc negative electrode including the oxide adhered to the zinc metal body.

For an electrolyte, an aqueous solution containing LiCl (12 M) as a lithium supporting salt and $ZnCl_2$ (0.1 M) as a zinc supporting salt was used.

Details of each of the negative electrode oxide, the separator, and the lithium supporting salt and the zinc supporting salt included in the electrolyte used in Example 1 are shown in Table 1. Table 1 also describes the details for Examples 2 to 19, Comparative Examples 1 to 5 and 7 to 9 described later.

With respect to the negative electrode prepared as described above, the average primary particle size of the oxide, the specific surface area of the oxide, and the crystallite size of the oxide were measured, respectively. In addition, a three-electrode cell using the positive electrode, the negative electrode, the electrolyte, and the separator prepared as described above and a saturated calomel electrode as a reference electrode was constructed. A charge-discharge evaluation test was performed by using the three-electrode cell. The container member of the cell was made of aluminum. The discharge capacity of the three-electrode cell and the average operating potential during the discharge were measured. The respective measurement results are shown in Table 2.

(Measurement of Average Primary Particle Size of Oxide)

The average primary particle size of the oxide was examined as follows. The negative electrode was taken out from the secondary battery, and the surface of the negative electrode was observed by using TEM. Ten arbitrary oxides were extracted from the surface of the negative electrode, and the average primary particle size was calculated.

(Specific Surface Area of Oxide)

The oxide-including layer was flaked off from the surface of the negative electrode and pulverized in a mortar to powder. After that, the specific surface area was calculated by using a BET method by a gas adsorption method using $N_2$ gas.

(Crystallite Size of Oxides)

The negative electrode was placed on a non-reflective glass sample plate without positional deviation, and wide angle X-ray scattering measurement was performed on the electrode surface. From the main peak of 2θ=25.34° attributed to anatase titanium oxide particles, the crystallite size was calculated by the Scherrer equation.

(Charge-Discharge Test)

A constant current test was performed on the three-electrode cell. The charge-discharge condition was set as follows. At the time of the charge, the potential was −1.4 V (vs. SCE) and the capacity termination was 1.5 (mAh/cm$^2$). At the time of the discharge, the potential was −0.8 V (vs. SCE) and the capacity termination was 1.5 (mAh/cm$^2$). The number of charge-and-discharge cycles until the capacity reached 80% when the capacity (mAh/cm$^2$) after 10 cycles of charge and discharge was defined as 100% and the dissolution and precipitation of zinc were repeated, or the number of charge-and-discharge cycles until charge and discharge became impossible due to short-circuiting caused by dendrite precipitation was defined as the life (number of times of charge-discharge).

(Measurement of Zinc Concentration and Lithium Concentration)

After the charge-discharge test, the electrolyte was taken out from the prepared beaker cell. The zinc concentration and the lithium concentration in the electrolyte were quantified by ICP analysis, and the mol concentration ratio Zn/Li was calculated.

The measurement results of Examples 2 to 18 and Comparative Examples 1 to 5 and 7 to 9 described later are also shown in Table 2.

Example 2

As a separator, a lithium ion conductive solid electrolyte plate having a thickness of 0.2 μm was used. Except for that, a secondary battery was constructed and measured in the same manner as in Example 1. For the solid electrolyte, LATP (composition formula: $Li_{1.3}Al_{0.3}Ti_{1.7}(PO_4)_3$) having a NASICON framework was used.

Example 3

Tungsten oxide (composition formula: $WO_3$) was used as the oxide. Except for that, a secondary battery was constructed and measured in the same manner as in Example 1.

Example 4

Rutile titanium oxide was used as the oxide. Except for that, a secondary battery was constructed and measured in the same manner as in Example 1.

Example 5

Monoclinic titanium oxide was used as the oxide. Except for that, a secondary battery was constructed and measured in the same manner as in Example 1.

Example 6

Anatase titanium oxide and tungsten oxide were mixed at a molar ratio of 1:1 and used as an oxide. Except for that, a secondary battery was constructed and measured in the same manner as in Example 1.

Examples 7 and 8

The Zn/Li ratio of the electrolyte was adjusted by changing the dissolving amount of zinc chloride (composition formula: $ZnCl_2$) in the electrolyte as the zinc supporting salt. Except for that, a secondary battery was constructed and measured in the same manner as in Example 1

Example 9

$LiNO_3$ was used as the lithium supporting salt, the dissolving amount thereof was adjusted, and no zinc supporting salt was used. Except for that, a secondary battery was constructed and measured in the same manner as in Example 1.

Example 10

$Li_2SO_4$ was used as the lithium supporting salt with the dissolving amount thereof adjusted, and the zinc salt was changed to $ZnSO_4$ with the dissolving amount thereof adjusted. Except for that, a secondary battery was constructed and measured in the same manner as in Example 1.

Example 11

As the lithium supporting salt in the electrolyte, LiCl (12 M) was added and LiOH (1 M) was further added. Except for that, a secondary battery was constructed and measured in the same manner as in Example 1.

Example 12

Zinc salt was not used as the supporting salt of the electrolyte. Except for that, a secondary battery was constructed and measured in the same manner as in Example 1. As indicated by the Zn/Li ratio in Table 1, zinc was detected because zinc was eluted from the negative electrode into the electrolyte in Example 12.

Example 13

Sole zinc metal was changed to titanium, and zinc metal was used for the container member of the cell. Except for that, a secondary battery was constructed and measured in the same manner as in Example 12. As indicated by the Zn/Li ratio in Table 1, zinc was detected because zinc was eluted from the negative electrode into the electrolyte in Example 13.

Example 14

As the zinc supporting salt of the electrolyte, the zinc salt was changed to $ZnSO_4$, and the dissolution amount was adjusted. Except for that, a secondary battery was constructed and measured in the same manner as in Example 1.

Examples 15 to 17

The primary particle diameter, the specific surface area, and the crystallite size of anatase titanium oxide as the oxide were changed as shown in Table 1. Except for that, a secondary battery was constructed and measured in the same manner as in Example 1.

Example 18

An electrolyte prepared by mixing 10 wt % of polyacrylonitrile with the liquid aqueous electrolyte and made into a gel was used. Except for that, a secondary battery was constructed and measured in the same manner as in Example 17.

Example 19

As the solid electrolyte used as the separator, a garnet $Li_7La_3Zr_2O_{12}$ (LLZ) having a thickness of 200 μm was used. Except for that, a secondary battery was constructed and measured in the same manner as in Example 2.

Comparative Example 1

An oxide material was not applied, and only a zinc negative electrode was used as the negative electrode. The supporting salt of the electrolyte was changed to a combination of LiCl (12 M) and $ZnCl_2$ (4 M). Except for that, a secondary battery was constructed and measured in the same manner as in Example 1.

Comparative Example 2

An oxide material was not applied, and only a zinc negative electrode was used as the negative electrode. The supporting salt of the electrolyte was changed to a combination of LiCl (12 M) and $ZnCl_2$ (4 M). Except for that, a secondary battery was constructed and measured in the same manner as in Example 2.

Comparative Examples 3 and 4

The Zn/Li ratio of the electrolyte was adjusted by changing the dissolution amount of zinc chloride (composition formula: $ZnCl_2$) in the electrolyte as the zinc supporting salt. Except for that, a secondary battery was constructed and measured in the same manner as in Example 1.

Comparative Examples 5 and 7

The primary particle diameter, the specific surface area, and the crystallite size of anatase titanium oxide as the oxide particles were changed as shown in Table 1. Except for that, a secondary battery was constructed and measured in the same manner as in Example 1.

Comparative Example 8

Lithium titanate (composition formula: $Li_4Ti_5O_{12}$) was used as the oxide. Except for that, a secondary battery was constructed and measured in the same manner as in Example 1.

Comparative Example 9

Lithium vanadate (composition formula: $LiV_3O_8$) was used as the oxide. Except for that, a secondary battery was constructed and measured in the same manner as in Example 1.

TABLE 1

| | Negative Electrode Oxide | | | |
|---|---|---|---|---|
| | Species | Average Primary Particle Diameter (μm) | Specific Surface Area (m²/g) | Crystallite Size (nm) |
| Example 1 | anatase titanium oxide | 0.02 | 100 | 15 |
| Example 2 | anatase titanium oxide | 0.02 | 100 | 15 |
| Example 3 | tungsten oxide | 0.02 | 40 | 30 |
| Example 4 | rutile titanium oxide | 0.02 | 70 | 18 |
| Example 5 | monoclinic titanium oxide | 0.02 | 80 | 16 |
| Example 6 | anatase titanium oxide + tungsten oxide | 0.02 | 60 | 25 |
| Example 7 | anatase titanium oxide | 0.02 | 100 | 15 |
| Example 8 | anatase titanium oxide | 0.02 | 100 | 15 |
| Example 9 | anatase titanium oxide | 0.02 | 100 | 15 |
| Example 10 | anatase titanium oxide | 0.02 | 100 | 15 |
| Example 11 | anatase titanium oxide | 0.02 | 100 | 15 |
| Example 12 | anatase titanium oxide | 0.02 | 100 | 15 |
| Example 13 | anatase titanium oxide | 0.02 | 100 | 15 |
| Example 14 | anatase titanium oxide | 0.02 | 100 | 15 |
| Example 15 | anatase titanium oxide | 0.1 | 15 | 100 |
| Example 16 | anatase titanium oxide | 0.08 | 20 | 50 |
| Example 17 | anatase titanium oxide | 0.01 | 270 | 5 |
| Example 18 | anatase titanium oxide | 0.01 | 270 | 5 |
| Example 19 | anatase titanium oxide | 0.02 | 100 | 15 |
| Comparative Example 1 | no oxide | — | — | — |
| Comparative Example 2 | no oxide | — | — | — |
| Comparative Example 3 | anatase titanium oxide | 0.02 | 100 | 15 |
| Comparative Example 4 | anatase titanium oxide | 0.02 | 100 | 15 |
| Comparative Example 5 | anatase titanium oxide | 0.2 | 8 | 120 |
| Comparative Example 7 | anatase titanium oxide | 0.1 | 8 | 150 |
| Comparative Example 8 | lithium titanate | 0.04 | 40 | 50 |
| Comparative Example 9 | lithium vanadium oxide | 0.04 | 40 | 50 |

TABLE 1-continued

| | Separator | | Electrolyte | | |
| --- | --- | --- | --- | --- | --- |
| | Kind | Thickness (μm) | Lithium Supporting Salt | Zinc Supporting Salt | Zn/Li |
| Example 1 | glass filter | 0.2 | LiCl 12M | $ZnCl_2$ 0.1M | 0.008 |
| Example 2 | solid electrolyte (LATP) | 0.2 | LiCl 12M | $ZnCl_2$ 0.1M | 0.008 |
| Example 3 | glass filter | 0.2 | LiCl 12M | $ZnCl_2$ 0.1M | 0.008 |
| Example 4 | glass filter | 0.2 | LiCl 12M | $ZnCl_2$ 0.1M | 0.008 |
| Example 5 | glass filter | 0.2 | LiCl 12M | $ZnCl_2$ 0.1M | 0.008 |
| Example 6 | glass filter | 0.2 | LiCl 12M | $ZnCl_2$ 0.1M | 0.008 |
| Example 7 | glass filter | 0.2 | LiCl 12M | $ZnCl_2$ 3.6M | 0.3 |
| Example 8 | glass filter | 0.2 | LiCl 12M | $ZnCl_2$ $1.2 \times 10^{-4}$ M | $1.0 \times 10^{-5}$ |
| Example 9 | glass filter | 0.2 | $LiNO_3$ 8M | no supporting salt | $1.0 \times 10^{-5}$ |
| Example 10 | glass filter | 0.2 | $Li_2SO_4$ 2M | $ZnSO_4$ 0.02M | 0.005 |
| Example 11 | glass filter | 0.2 | LiCl 12M + LiOH 1M | $ZnCl_2$ 0.1M | 0.008 |
| Example 12 | glass filter | 0.2 | LiCl 12M | no supporting salt | $1.0 \times 10^{-5}$ |
| Example 13 | glass filter | 0.2 | LiCl 12M | no supporting salt | $1.0 \times 10^{-5}$ |
| Example 14 | glass filter | 0.2 | LiCl 12M | $ZnSO_4$ 0.01M | 0.0008 |
| Example 15 | glass filter | 0.2 | LiCl 12M | $ZnCl_2$ 0.1M | 0.008 |
| Example 16 | glass filter | 0.2 | LiCl 12M | $ZnCl_2$ 0.1M | 0.008 |
| Example 17 | glass filter | 0.2 | LiCl 12M | $ZnCl_2$ 0.1M | 0.008 |
| Example 18 | glass filter | 0.2 | LiCl 12M | $ZnCl_2$ 0.1M | 0.008 |
| Example 19 | solid electrolyte (LLZ) | 200 | LiCl 12M | $ZnCl_2$ 0.1M | 0.008 |
| Comparative Example 1 | glass filter | 0.2 | LiCl 12M | $ZnCl_2$ 4M | 0.5 |
| Comparative Example 2 | solid electrolyte (LATP) | 0.2 | LiCl 12M | $ZnCl_2$ 4M | 0.5 |
| Comparative Example 3 | glass filter | 0.2 | LiCl 12M | $ZnCl_2$ 1.2M | 0.4 |
| Comparative Example 4 | glass filter | 0.2 | LiCl 12M | $ZnCl_2$ $1.2 \times 10^{-5}$ M | $1.0 \times 10^{-6}$ |
| Comparative Example 5 | glass filter | 0.2 | LiCl 12M | $ZnCl_2$ 0.1M | 0.008 |
| Comparative Example 7 | glass filter | 0.2 | LiCl 12M | $ZnCl_2$ 0.1M | 0.008 |
| Comparative Example 8 | glass filter | 0.2 | LiCl 12M | $ZnCl_2$ 0.1M | 0.008 |
| Comparative Example 9 | glass filter | 0.2 | LiCl 12M | $ZnCl_2$ 0.1M | 0.008 |

TABLE 2

| | Discharge Capacity (mAh/cm$^2$) | Average Operating Potential during Discharge (V vs. SCE) | Life Time (Number of Charge-discharge) |
| --- | --- | --- | --- |
| Example 1 | 1.5 | −1.2 | 400 |
| Example 2 | 1.5 | −1.2 | 600 |
| Example 3 | 1.2 | −1.2 | 600 |
| Example 4 | 1.2 | −1.2 | 600 |
| Example 5 | 1.4 | −1.2 | 400 |
| Example 6 | 1.3 | −1.2 | 500 |
| Example 7 | 1.8 | −1.2 | 400 |
| Example 8 | 1.2 | −1.2 | 600 |
| Example 9 | 1.5 | −1.15 | 400 |
| Example 10 | 1.5 | −1.1 | 400 |
| Example 11 | 1.5 | −1.2 | 500 |
| Example 12 | 1.4 | −1.2 | 600 |
| Example 13 | 1.4 | −1.2 | 600 |
| Example 14 | 1.5 | −1.2 | 400 |
| Example 15 | 1.2 | −1.2 | 400 |
| Example 16 | 1.2 | −1.2 | 500 |
| Example 17 | 2.1 | −1.2 | 700 |
| Example 18 | 1.5 | −1.2 | 450 |
| Example 19 | 1.5 | −1.2 | 600 |
| Comparative Example 1 | 1.5 | −1.1 | 100 |
| Comparative Example 2 | 1.5 | −1.1 | 200 |
| Comparative Example 3 | 1.8 | −1.2 | 200 |
| Comparative Example 4 | 0.8 | −1.2 | 100 |
| Comparative Example 5 | 0.8 | −1.2 | 200 |
| Comparative Example 7 | 0.8 | −1.2 | 200 |
| Comparative Example 8 | 0.5 | −1.6 | 100 |
| Comparative Example 9 | 0.3 | −0.4 | 400 |

As shown in Table 2, high discharge capacity was obtained in Comparative Example 1 using only a simple zinc dissolution-precipitation reaction. On the other hand, in Comparative Example 1, short-circuiting due to dendrite precipitation occurred, and the life performance was 100 times. Although the short-circuiting was prevented in Comparative Example 2 using the solid electrolyte, capacity deterioration occurred due to overvoltage accompanying dendrite precipitation, and the life performance was 200 times. On the other hand, in Example 1, it is understood that the operating potential has become lower by the hybrid reaction of the insertion and extraction of lithium and the dissolution and precipitation of zinc, and life performance has improved by suppressing the precipitation of dendrite. In addition, in Example 2 using the solid electrolyte, it is understood that the life performance has improved by further suppressing the precipitation of dendrite as compared with Example 1.

In Examples 3 to 6, oxides were changed from Example 1, and the specific surface area, the average primary particle size, and the crystallite size were changed due to change in the shapes of the oxides. Even with these changes, it can be seen that, in Examples 3 to 6, better discharge capacity and life are obtained as compared with Comparative Examples 1 and 2.

In Comparative Examples 8 and 9, oxides are changed from Example 1. Comparative Example 8, in which lithium titanate was used as oxide particles, is a case where the lithium insertion-extraction potential was lower than −1.4 V (vs. SCE). In Comparative Example 8, since the lithium insertion-extraction potential did not overlap the potential region of the dissolution and precipitation of zinc, the generation of hydrogen was observed with the insertion and extraction of lithium. As a result, the discharge capacity was low because the precipitation of zinc was not included, and the life was lower than in Examples 1 to 19 because of the increase in overvoltage due to the generation of bubbles caused by the generation of hydrogen.

In Comparative Example 9 using lithium vanadate, the lithium insertion-extraction potential exceeds −1.0 V (vs. SCE). In Comparative Example 9, since the generation of hydrogen is little, the reversibility of insertion and extraction of lithium is good and the life performance is good. On the other hand, since the lithium insertion-extraction potential does not overlap the potential region of the dissolution and precipitation of zinc, the charge and discharge in Comparative Example 9 does not include the precipitation of zinc. Therefore, the discharge capacity in Comparative Example 9 was lower than those in Examples 1 to 19.

In Examples 7 and 8 and Comparative Examples 3 and 4, the Zn/Li ratio was adjusted by changing, from Example 1, the dissolving amount of zinc chloride $ZnCl_2$ in the electrolyte as a supporting salt. The discharge capacities and life times of Examples 7 and 8 were satisfactory. On the other hand, in Comparative Example 3 in which Zn/Li was high, dendrites easily precipitate and poor life performance was obtained. In addition, in Comparative Example 4 in which Zn/Li was low, sufficient discharge capacity could not be obtained since the charge and discharge of zinc do not proceed, and self-discharge occurred due to the generation of hydrogen. Therefore, the life performance deteriorated due to the overvoltage caused by liquid exhaustion that had occurred due to bubbles remaining in the cell.

In Examples 9 to 11, the lithium supporting salt was changed from Example 1. In this case as well, better discharge capacity and life performance are obtained as compared with the comparative examples. In particular, the mode of the dissolution and precipitation of zinc had changed by adding lithium hydroxide, and the life performance became even better. The average operating potential during the discharge had changed, but this is due to the change in salt concentration.

In Examples 12 and 13, no zinc salt was used in the electrolyte. Nevertheless, as described in Table 1, when the Zn/Li ratio in the electrolyte was measured, a value of $1.0 \times 10^{-5}$ was detected. In Example 12, since zinc was included in the electrolyte due to elution from the zinc metal body, better discharge capacity and life performance were obtained as compared with the comparative examples. Example 13 is a case where the negative electrode did not include zinc and zinc was used for the container member. The zinc metal was eluted in the same manner as in Example 12, and the electrolyte of Example 13 included zinc. Therefore, in Example 13, better discharge capacity and life performance were obtained as compared with the comparative examples.

In Example 14, only zinc supporting salt was changed from Example 1. Even in the case of Example 14 in which anions were mixed, better discharge capacity and life performance were obtained as compared with Comparative Examples.

In Examples 15 to 17 and Comparative Examples 5 and 7, the average primary particle size, the specific surface area, and the crystallite size of the oxides were changed from Example 1. In Examples 15 to 17, better discharge capacity and life performance were obtained as compared with the comparative examples. In particular, when the crystallite size is 1 nm or more and 50 nm or less, the performance is further improved. On the other hand, in Comparative Example 5 and Comparative Example 7 in which the specific surface area is less than 10 $m^2/g$ and the average primary particle size is more than 0.1 μm, surfaces for coating with zinc has decreased whereby the discharge capacity has decreased, and the life performance has deteriorated due to dendrite precipitation.

In Example 18, the electrolyte used in Example 1 was gelled. Zinc dendrite formation was suppressed by making the electrolyte into a gel, and the life performance was improved. In Example 19, the solid electrolyte of Example 2 was changed from LATP to LLZ. In Example 19 as well, the same results as in Examples 1 to 18 were obtained. Therefore, it can be said that any solid electrolyte which is chemically stable and has relatively good Li conductivity can be applied.

According to at least one embodiment and example described above, the lithium zinc secondary battery includes a positive electrode, a negative electrode, an aqueous electrolyte, and a separator. Zinc is dissolved and deposited at the negative electrode. The negative electrode includes a zinc-including metal body and an oxide on at least a part of a surface of the metal body. The aqueous electrolyte includes zinc and a lithium salt. The separator is positioned between the positive electrode and the negative electrode. Lithium is inserted and extracted from the oxide in a potential range of −1.4 V (vs. SCE) or more and −1.0 V (vs. SCE) or less. A specific surface area of the oxide is in a range of from 10 $m^2/g$ or more and 350 $m^2/g$ or less. A mol concentration ratio Zn/Li between the zinc and the lithium in the aqueous electrolyte is in a range of from $1.0 \times 10^{-5}$ or more and 0.3 or less. The secondary battery having the above configuration is capable of having excellent cycle properties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lithium zinc secondary battery comprising:
a positive electrode;
a negative electrode comprising a zinc-including metal body and an oxide on at least a part of a surface of the zinc-including metal body;
an aqueous electrolyte comprising zinc and a lithium salt; and
a separator between the positive electrode and the negative electrode,
the zinc being dissolved and deposited at the negative electrode, lithium being inserted and extracted from the oxide in a potential range of −1.4 V (vs. SCE) or more and −1.0 V (vs. SCE) or less, a specific surface area of the oxide being from 10 m$^2$/g or more and 350 m$^2$/g or less, and a mol concentration ratio Zn/Li between the zinc and the lithium in the aqueous electrolyte being from $1.0 \times 10^{-5}$ or more and 0.3 or less.

2. The lithium zinc secondary battery according to claim 1, wherein the zinc is present on at least a part of a surface of the oxide.

3. The lithium zinc secondary battery according to claim 1, wherein the oxide comprises at least one selected from the group consisting of a titanium oxide and a tungsten oxide.

4. The lithium zinc secondary battery according to claim 1, wherein an average primary particle diameter of the oxide is from 0.01 μm or more and 0.1 μm or less.

5. The lithium zinc secondary battery according to claim 1, wherein a crystallite size of the oxide is from 1 nm or more and 50 nm or less.

6. The lithium zinc secondary battery according to claim 1, wherein the mol concentration ratio Zn/Li between the zinc and the lithium in the aqueous electrolyte is from $1.0 \times 10^{-4}$ or more and 0.1 or less.

7. The lithium zinc secondary battery according to claim 1, wherein the separator comprises a solid electrolyte having lithium ion conductivity.

8. A battery pack comprising the lithium zinc secondary battery according to claim 1.

9. The battery pack according to claim 8, further comprising an external power distribution terminal and a protective circuit.

10. The battery pack according to claim 8, further comprising plural of the lithium zinc secondary battery,
wherein the lithium zinc secondary batteries are electrically connected in series, in parallel, or in combination of in series connection and in parallel connection.

11. A vehicle comprising the battery pack according to claim 8.

12. The vehicle according to claim 11, wherein the battery pack is configured to recover a regenerative energy of motive force of the vehicle.

13. The vehicle according to claim 11, which comprises a mechanism configured to convert kinetic energy of the vehicle into regenerative energy.

14. A stationary power supply comprising the battery pack according to claim 8.

* * * * *